US009665975B2

(12) United States Patent
Goel et al.

(10) Patent No.: US 9,665,975 B2
(45) Date of Patent: May 30, 2017

(54) SHADER PROGRAM EXECUTION TECHNIQUES FOR USE IN GRAPHICS PROCESSING

(71) Applicant: QUALCOMM Incorporated, San Diego, CA (US)

(72) Inventors: Vineet Goel, La Jolla, CA (US); Donghyun Kim, San Diego, CA (US); Gang Zhong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/466,554

(22) Filed: Aug. 22, 2014

(65) Prior Publication Data

US 2016/0055667 A1 Feb. 25, 2016

(51) Int. Cl.
*G06T 1/00* (2006.01)
*G06T 15/83* (2011.01)
*G06T 15/00* (2011.01)

(52) U.S. Cl.
CPC ............ *G06T 15/83* (2013.01); *G06T 15/005* (2013.01)

(58) Field of Classification Search
CPC ......... G06T 15/005; G06T 1/20; G06T 15/04; G09G 5/363; G06F 9/3851
USPC ........................................................ 345/522
See application file for complete search history.

(56) References Cited

U.S. PATENT DOCUMENTS 7,671,862 B1    3/2010  Patel et al.
8,254,701 B1 *  8/2012  Diard ...................... G06T 9/001
                                                        382/232
8,659,601 B1 *  2/2014  Mahan .................. G06T 15/005
                                                        345/419

(Continued)

FOREIGN PATENT DOCUMENTS

WO    2015153164 A1    10/2015

OTHER PUBLICATIONS

"Praise for OpenGL Programming Guide, Eighth Edition" (published in 2013, by Dave Shreiner, Graham Sellers, John Kessenich, and Bill Licea-Kane).*

(Continued)

*Primary Examiner* — Ke Xiao
*Assistant Examiner* — Gordon Liu
(74) *Attorney, Agent, or Firm* — Shumaker & Sieffert, P.A.

(57) ABSTRACT

This disclosure describes techniques for executing shader programs in a graphics processing unit (GPU). In some examples, the techniques for executing shader programs may include executing, with a shader unit of a graphics processor, a shader program that performs vertex shader processing and that generates multiple output vertices for each input vertex that is received by the shader program. In further examples, the techniques for executing shader programs may include executing a merged vertex/geometry shader program using a non-replicated mode of execution. The non-replicated mode of execution may involve assigning each of a plurality of primitives to one merged vertex/geometry shader program instance per primitive and causing each of the instances to output a plurality of vertices. In additional examples, the techniques for executing shader programs may include techniques for selecting one of a (Continued)

non-replicated mode and a replicated mode for executing a merged vertex/geometry shader program.

28 Claims, 11 Drawing Sheets

(56) References Cited

U.S. PATENT DOCUMENTS

| | | |
|---|---|---|
| 2008/0094408 A1 | 4/2008 | Yin et al. |
| 2009/0237401 A1 | 9/2009 | Wei et al. |
| 2009/0295804 A1 | 12/2009 | Goel et al. |
| 2011/0080415 A1* | 4/2011 | Duluk, Jr. ................. G06T 1/20 345/506 |
| 2011/0084976 A1 | 4/2011 | Duluk, Jr. et al. |
| 2011/0216068 A1 | 9/2011 | Sathe |
| 2013/0265308 A1* | 10/2013 | Goel ....................... G06T 15/80 345/426 |
| 2014/0204080 A1 | 7/2014 | Goel et al. |

OTHER PUBLICATIONS

International Search Report and Written Opinion from International Application No. PCT/US2015/044279, dated Mar. 4, 2016, 18 pp.
Partial International Search Report from International Application No. PCT/US2015/044279, dated Jan. 7, 2016, 6 pp.
Response to Written Opinion dated Mar. 4, 2016, from International Application No. PCT/US2015/044279, filed on Jun. 16, 2016, 4 pp.
Second Written Opinion from International Application No. PCT/US2015/044279, dated Aug. 25, 2016, 4 pp.
International Preliminary Report on Patentability from International Application No. PCT/US2015/044279, dated Nov. 22, 2016, 6 pp.

* cited by examiner

```
VS:
    'Normal' VS code        // can use instanceID,
                            //   initial registers stores primitveiD, misc, rel_prim
                            // Data left in GPRs
    END_FINAL;              // End if DX9 style Shader – ignore otherwise
                            // note that it is SP which writes gprs to VPC
                            //    if shader ends.
```
⎫ 82

```
    if(misc->reuse)
        LM_Vs_offset = fiber_id_vertex*VERT_SIZE;
    else
        LM_Vs_offset = rel_primID*PRIM_SIZE + rel_vertex*VERT_SIZE;
    Write vertex data in GPR to LM_Vs_offset
    CHMSK            // switch resource ptr to GS resources offset
                     // use cov_mask_1 for second stage
    CHSH             // Switch to GS PC
```
88 ⎬ 86

```
GS: For (vertex_id= 0; vertex_id++; vertex_id <= max_input)
    {
        if(misc->reuse)
90 {       Load from LM using offset = misc->vertex_id * VERT_SIZE;
        else
            Load from LM using offset = rel_primID*PRIM_SIZE +
                                         vertex_id * VERT_SIZE;

// fetch from LM using base address computed by HLSQ
    }
    for(streamid =0;streamid++;streamid<4)
    cut[streamid] = true;
    gsoutount = 0;
    // 'normal' GS code
    {.. using primitiveID, GSInstanceID
    CUT(streamid):      { Cut[streamid] = true;}
    EMIT(streamid): {
        oPos = vertex.pos; oColor =vertex.clr;
        oMisc = (cut[streamid],streamid,gscount)
        if(optimized_mode) // this is boolean constant set by driver at draw time
            SP output data to VPC
92 {    else
            If(Gsoutcount==GsoutvertID)
            go to END_FINAL;
    }
    cut[streamid] = false;
    gsoutcount++;
}
.
if(optimized_mode)
    oMisc = (cut[streamid],streamid,gscount); SP output data to VPC        ⎬ 92
END_FINAL
```
84

FIG. 7

SHADER PROGRAM EXECUTION TECHNIQUES FOR USE IN GRAPHICS PROCESSING

TECHNICAL FIELD

This disclosure relates to graphics processing systems, and more particularly, to executing shader programs in graphics processing systems.

BACKGROUND

Computing devices often utilize a graphics processing unit (GPU) to accelerate the rendering of graphics data for display. Such computing devices may include, e.g., computer workstations, mobile phones (e.g., so-called smartphones), embedded systems, personal computers, tablet computers, and video game consoles. GPUs typically implement a graphics processing pipeline that includes a plurality of processing stages which operate together to execute graphics processing commands. Traditionally, GPUs included a fixed-function graphics processing pipeline where each processing stage in the pipeline was implemented with fixed function hardware (e.g., hardware that is hard-wired to perform a certain set of specialized functions and not capable of executing a user-downloadable program).

More recently, graphics processing pipelines have shifted to a programmable architecture where one or more processing stages in the pipeline are programmable processing stages and are implemented with one or more programmable shader units. Each of the programmable shader units may be configured to execute a shader program. A user application may specify the shader program to be executed by the programmable processing stages in a programmable graphics pipeline, thereby providing a high degree of flexibility in the use of modern day GPUs.

As graphics processing technology develops, graphics processing pipelines are becoming more sophisticated and an increasing number of different types of programmable processing stages are being added to the standard graphics processing pipelines that are specified by the major graphics application programming interfaces (APIs). Implementing these different types of programmable processing stages with the limited resources in a GPU can present significant challenges.

SUMMARY

This disclosure describes techniques for executing shader programs in a graphics processing unit (GPU). A shader program may refer to a program that is loaded onto a GPU and executed by the GPU with one or more shader units that are included in the GPU. A GPU may execute multiple instances of a shader program where each of the instances of the shader program executes the same program instructions with respect to different data items. Example data items may include vertices, primitives, and pixels. Shader programs that process vertices are typically configured to generate a single output vertex for each of the input vertices that are received by the shader program. However, the techniques of this disclosure may, in some examples, execute a shader program that performs vertex shader processing and that generates multiple output vertices for each input vertex that is received by the shader program.

Executing a shader program that performs vertex shader processing and that generates multiple output vertices for each of the input vertices that are received by the shader program may reduce the number of threads that are needed to process a particular set of input vertices relative to the number of threads that are needed when a shader program is used that merely generates a single output vertex for each input vertex. Reducing the number of threads that are used to process vertices may reduce the processing resources used by a GPU and/or reduce the power consumed by a GPU. Moreover, allowing a shader program that performs vertex shader processing to generate multiple output vertices for each input vertex may improve the programming flexibility of a GPU. In this way, the performance, power consumption, and/or programming flexibility of a GPU that performs programmable vertex processing may be improved.

In one example, this disclosure describes a method that includes executing, with a shader unit of a graphics processor, a shader program that performs vertex shader processing and that generates multiple output vertices for each input vertex that is received by the shader program.

In another example, this disclosure describes a device that includes a graphics processing unit (GPU) comprising a shader unit configured to execute a shader program that performs vertex shader processing and that generates multiple output vertices for each input vertex that is received by the shader program.

In another example, this disclosure describes an apparatus that includes a graphics processor comprising a shader unit. The apparatus further includes means for executing, with the shader unit of the graphics processor, a shader program that performs vertex shader processing and that generates multiple output vertices for each input vertex that is received by the shader program.

In another example, this disclosure describes a non-transitory computer readable storage medium storing instructions that upon execution by one or more processors cause the one or more processors to execute, with a shader unit of a graphics processor, a shader program that performs vertex shader processing and that generates multiple output vertices for each input vertex that is received by the shader program.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 illustrates pseudo code associated with executing a merged vertex/geometry shader program according to this disclosure.

DETAILED DESCRIPTION

Figure 1:
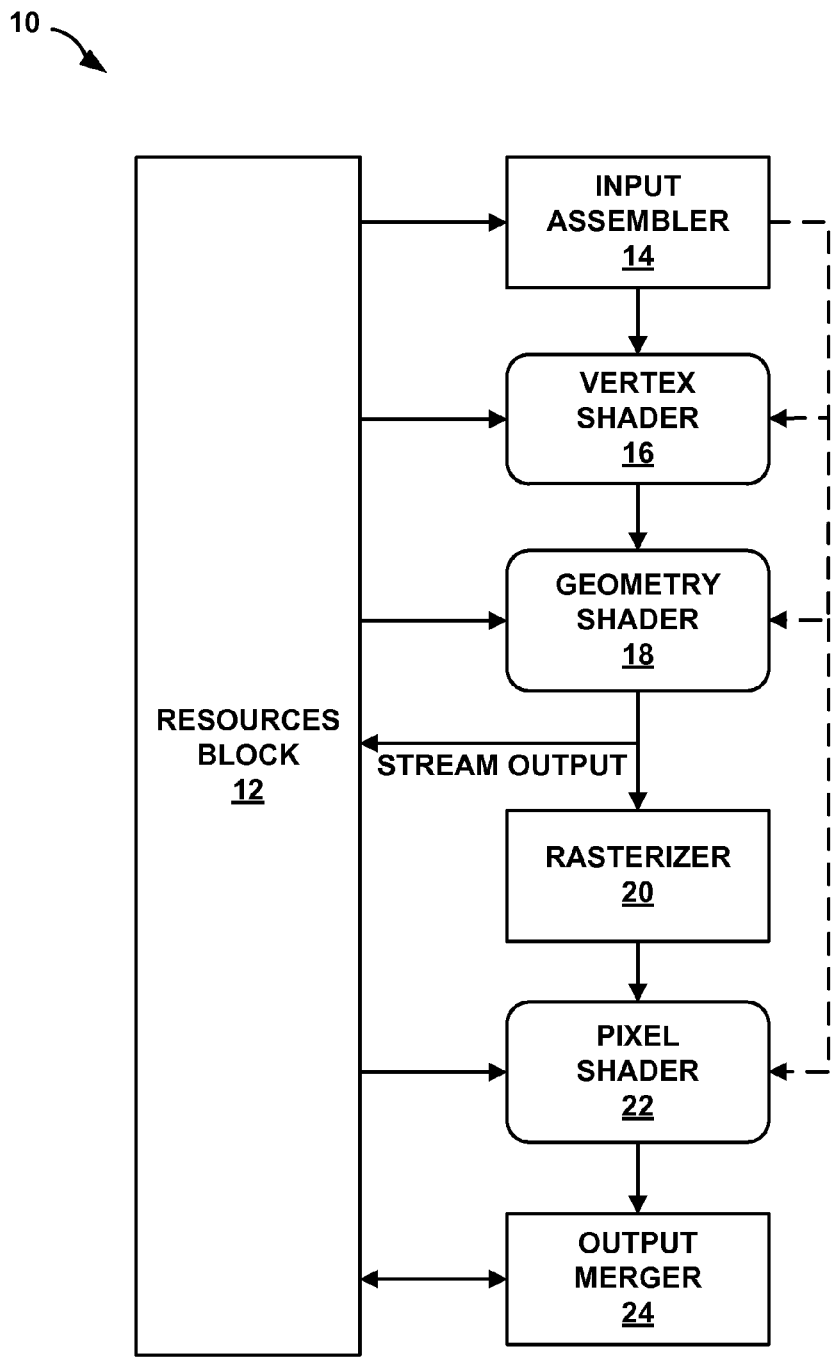
FIG. 1 is a conceptual diagram illustrating an example graphics pipeline that may be implemented by using the shader program execution techniques of this disclosure.

This disclosure describes techniques for executing shader programs in a graphics processing unit (GPU). A shader program may refer to a program that is loaded onto a GPU and executed by the GPU with one or more shader units that are included in the GPU. A GPU may execute multiple instances of a shader program where each of the instances of the shader program executes the same program instructions with respect to different data items. Example data items may include vertices, primitives, and pixels. Shader programs that process vertices are typically configured to generate a single output vertex for each of the input vertices that are received by the shader program. However, the techniques of this disclosure may, in some examples, execute a shader program that performs vertex shader processing and that generates multiple output vertices for each input vertex that is received by the shader program.

Executing a shader program that performs vertex shader processing and that generates multiple output vertices for each of the input vertices that are received by the shader program may reduce the number of threads that are needed to process a particular set of input vertices relative to the number of threads that are needed when a shader program is used that merely generates a single output vertex for each input vertex. Reducing the number of threads that are used to process vertices may reduce the processing resources used by a GPU and/or reduce the power consumed by a GPU. In this way, the performance and/or power consumption of a GPU that performs programmable vertex processing may be improved.

Moreover, allowing a shader program that performs vertex shader processing to generate multiple output vertices for each input vertex may improve the programming flexibility of a GPU. Typically, vertex shader programming models specify that a vertex shader program is to be invoked once for each input vertex and that the vertex shader program is to generate a single output vertex for each invocation of the vertex shader program. The techniques of this disclosure may be used to implement a vertex shader programming model that allows multiple output vertices to be generated for each invocation of a vertex shader program. In this way, the flexibility of programmable vertex processing performed by a GPU may be improved.

In some examples, the shader program that performs the vertex shader processing and that generates multiple output vertices for each of the input vertices that are received by the shader program may be a merged vertex/geometry shader program. A merged vertex/geometry shader program may refer to a shader program that is configurable to perform vertex shader processing with respect to a vertex and geometry shader processing with respect to a primitive. Geometry shader programs are typically configured to receive an input primitive and output zero or more output primitives in response to receiving the input primitive. Because each of the output primitives that are generated by a geometry shader program may include more than one vertex, if a merged vertex/geometry shader program generates only a single output vertex for each input vertex, then multiple instances of the merged vertex/geometry shader program may need to be executed for each of the primitives in order to perform geometry shader processing for the primitives. Executing a merged vertex/geometry shader program that generates multiple output vertices for each vertex received by the shader program according to the techniques of this disclosure, however, may allow, in some examples, geometry shader processing for each of the primitives to be performed with a single instance of the merged vertex/geometry shader program per primitive.

Allowing the geometry shader processing to be performed with a single instance of the merged vertex/geometry shader program per primitive may reduce the number of instances of the merged vertex/geometry shader program that are needed to process a particular set of primitives relative to techniques that require multiple instances of a merged vertex/geometry shader program to be executed for each primitive. Reducing the number of instances of a merged vertex/geometry shader program that are used to process primitives may reduce the processing resources used by a GPU, reduce the number of resource allocations performed by a GPU, and/or reduce the power consumed by a GPU. In this way, the performance and/or power consumption of a GPU that performs programmable vertex shading and programmable geometry shading with merged vertex/geometry shader programs may be improved.

In some examples, the techniques for executing shader programs may include executing a merged vertex/geometry shader program using a non-replicated mode of execution. Executing a merged vertex/geometry shader program using a non-replicated mode of execution may involve assigning each of a plurality of primitives to a respective instance of the merged vertex/geometry shader program for geometry shader processing, and causing each of the instances of the merged vertex/geometry shader program to output M vertices where M corresponds to the number of vertices that are generated for each primitive by a geometry shader program that corresponds to the merged vertex/geometry shader program. A merged vertex/geometry shader program that generates multiple output vertices for each input vertex received by the shader program according to his disclosure may be used when executing the merged vertex/geometry shader program according to the non-replicated mode of execution.

In contrast, a replicated mode of execution for executing a merged vertex/geometry shader program may involve assigning each of the primitives to be processed to N instances of the merged vertex/geometry shader program, and causing each of the instances of the merged vertex/geometry shader program to output a single vertex. In some examples, N may be equal to a maximum output vertex count value that is specified by a geometry shader program that corresponds to the merged vertex/geometry shader program.

The non-replicated mode for executing merged vertex/geometry shader programs may use one instance of the merged vertex/geometry shader program per primitive to perform geometry shader processing, while the replicated mode for executing merged vertex/geometry shader programs may use N instances of the merged vertex/geometry shader program per primitive to perform geometry shader processing. Thus, using the non-replicated mode for executing merged vertex/geometry shader programs may reduce the number of instances of a merged vertex/geometry shader program that are needed to process a particular set of primitives relative to the replicated mode. As already discussed above, reducing the number of instances of the merged vertex/geometry shader program that are used to process primitives may reduce the processing resources used by a GPU, reduce the number of resource allocations performed by a GPU, and/or reduce the power consumed by a GPU. In this way, the performance and/or power consumption of a GPU that performs programmable vertex shading and programmable geometry shading with merged vertex/geometry shader programs may be improved.

In further examples, the techniques for executing shader programs in a GPU may include techniques for allowing a shader unit to switch between a non-replicated mode for executing merged vertex/geometry shader programs and a replicated mode for executing merged vertex/geometry shader programs. Allowing a shader unit to switch between a non-replicated mode and a replicated mode for executing merged vertex/geometry shader programs may provide additional control and/or flexibility to users of the graphics processor in order to choose particular execution modes that are tailored toward particular processing requirements, such as, e.g., performance requirements, power consumption requirements, etc.

In additional examples, the techniques for executing shader programs may include techniques for selecting between the non-replicated mode and the replicated mode for executing a merged vertex/geometry shader program and causing a shader unit to execute the merged vertex/geometry shader program according to the selected shader program execution mode. In some examples, the techniques for selecting between the non-replicated mode and the replicated mode may select between the non-replicated mode and the replicated mode based on a total amount of storage space required to store output vertices associated with one application programming interface (API) invocation of a geometry shader program that corresponds to the merged vertex/geometry shader program and/or based on the amount of vertex amplification performed by the geometry shader program that corresponds to the merged vertex/geometry shader program.

In general, the amount of storage space (e.g., general purpose registers (GPRs)) for storing output vertices in a shader unit may be limited. Because the non-replicated mode for executing merged vertex/geometry shader programs allows multiple vertices to be generated by each of the instances of the merged vertex/geometry shader program, the amount of storage space needed to store output vertices for the non-replicated mode may be greater than that which is needed for the replicated mode. If the amount of storage space included in a shader unit is not sufficient to store the output vertices for a given set of instantiations of a merged vertex/geometry shader program that are to be executed in parallel, then external memory accesses may need to be performed, which may significantly reduce the performance of the shader unit.

As discussed above, the non-replicated mode for executing merged vertex/geometry shader programs may provide better performance and/or reduced power consumption for executing a given set of instantiations of a merged vertex/geometry shader program in parallel. However, if output vertex storage space requirements associated with executing the set of instantiations of the merged vertex/geometry shader program are greater than the amount of output vertex storage space available in the shader unit, then the performance and/or power improvements achieved by not replicating the geometry shader processing may be outweighed by the reduction in performance caused by external memory accesses.

Thus, the non-replicated mode for executing merged vertex/geometry shader programs may provide better performance and/or reduced power consumption if storage space requirements for storing the output vertices are relatively small (e.g., if the output vertex storage space requirements are less than or equal to the amount of output vertex storage space contained in the shader unit). On the other hand, the replicated mode for executing merged vertex/geometry shader programs may provide better performance if the storage space requirements for storing output vertices are relatively high (e.g., if the output vertex storage space requirements are greater than the amount of output vertex storage space contained in the shader unit).

Selecting between the non-replicated mode and the replicated mode based on a total amount of storage space required to store output vertices associated with one API invocation of a geometry shader program and/or based on the amount of vertex amplification performed by the geometry shader may allow a graphics system to use the non-replicated mode for executing merged vertex/geometry shader programs when the amount of storage space needed to store output vertices is relatively small, and to use the replicated mode for executing merged vertex/geometry shader programs when the amount of space needed to store output vertices is relatively large. In this way, the benefits of using the non-replicated mode may be obtained for shader programs with relatively small output vertex storage requirements while avoiding the performance drawbacks associated with external memory accesses in cases where the storage space of the shader unit is not sufficient for storing the output vertices associated with a shader program.

In further examples, the techniques for executing shader programs may include techniques for generating compiled code for a merged vertex/geometry shader program where the compiled code includes instructions that cause a shader unit to selectively execute the merged vertex/geometry shader program according to the non-replicated mode or the replicated mode based on information indicative of a mode to be used for execution of the shader program. Placing instructions in the compiled code for the merged vertex/geometry shader program that are capable selectively executing either mode may allow the processing mode of the shader unit to be changed without having to reload a new shader program into the shader unit. Moreover, placing instructions in the compiled code for the merged vertex/geometry shader program that are capable selectively executing either mode may also simplify the compilation of the merged vertex/geometry shader program.

FIG. 1 is a conceptual diagram illustrating an example graphics pipeline 10 that may be implemented by using the shader program execution techniques of this disclosure. In some examples, graphics pipeline 10 may correspond to a Microsoft® DirectX (DX) 10 graphics pipeline. In further examples, graphics pipeline 10 may correspond to a Microsoft® DX 11 graphics pipeline with tessellation disabled.

Graphics pipeline 10 is configured to render one or more graphics primitives into a render target. Graphics pipeline 10 includes a resources block 12, an input assembler 14, a vertex shader 16, a geometry shader 18, a rasterizer 20, a pixel shader 22 and an output merger 24.

Resources block 12 may correspond to one or more memory resources used by pipeline stages in graphics pipeline 10, such as, e.g., one or more textures and/or one or more buffers (e.g., vertex buffers, frame buffers, etc.). The processing stages depicted in FIG. 1 with straight corners represent fixed-function processing stages, and the processing stages depicted in FIG. 1 with rounded corners represent programmable processing stages. For example, as shown in FIG. 1, input assembler 14, rasterizer 20, and output merger 24 are fixed-function processing stages, and vertex shader 16, geometry shader 18, and pixel shader 22 are programmable processing stages.

A programmable processing stage may refer to a processing stage that is configured to execute a program (e.g., a shader program) that is defined by, compiled by, and/or loaded onto a GPU that implements graphics pipeline 10 by a host device that uses the GPU. In some cases, the program may be defined by a user-level graphics application executing on a host device and loaded onto the GPU by a GPU driver executing on the host device. A fixed-function processing stage may include hardware that is not configured to receive and execute programs from a host device. The hardware included in a fixed-function processing stage may be hard-wired to perform certain functions. Although the hardware included in a fixed-function processing stage may be configurable, the configurability of the hardware is based on one or more control signals as opposed to being based on a program (e.g., a shader program).

Each of the programmable stages shown in graphics pipeline 10 may be configured to execute a shader program of a particular type. For example, vertex shader 16 may be configured to execute a vertex shader program, geometry shader 18 may be configured to execute a geometry shader program, and pixel shader 22 may be configured to execute a pixel shader program.

A GPU that implements graphics pipeline 10 may include one or more shader units that are configured to execute the different types of shader programs. Each of the different types of shader programs may execute on a common shader unit of a GPU that implements graphics pipeline 10 and/or on one or more dedicated shader units that are dedicated to executing shader programs of one or more particular types.

In some examples, a vertex shader program and a geometry shader program may be merged into a merged vertex/geometry shader program and a shader unit in a GPU that implements graphics pipeline 10 may execute the merged vertex/geometry shader program as described in further detail later in this disclosure. In such examples, the shader unit may, in some examples, be further configured to execute a pixel shader program as a separate program at times when merged vertex/geometry shader program is not executing on the shader unit.

The general operation of graphics pipeline 10 will now be described. Graphics pipeline 10 begins rendering a set of primitives in response to receiving a draw call command and data indicative of one or more primitives to be rendered. The data indicative of the primitives to be rendered may include, for example, one or more vertex buffers, one or more index buffers, and/or one or more state configurations indicative of the type of primitive to be rendered. The vertex buffers and/or index buffers may, in some examples, be stored in resources block 12.

Input assembler 14 may retrieve one or more vertices from resources block 12, form geometry (e.g., primitives) based on the vertices, and issue the vertices to vertex shader 16 for further processing. Input assembler 14 may also generate one or more system generated values for each of the vertices and supply the system generated values to vertex shader 16 and/or geometry shader 18. For example, input assembler 14 may generate vertex identification values that uniquely identify each of the vertices in a particular draw call and supply the vertex identification values to vertex shader 16 and/or geometry shader 18. As another example, input assembler 14 may generate primitive identification values that uniquely identify each of the primitives in a particular draw call, and supply the primitive identification values to geometry shader 18.

Vertex shader 16 may generate output vertices based on the vertices received from input assembler 14 and based on a vertex shader program. From a programming perspective, in order to generate the output vertices, vertex shader 16 may execute a respective instance of the vertex shader program for each of the vertices that are received from input assembler 14. In some examples, the vertex shader program may perform per-vertex processing on the input vertices to generate the output vertices. Per-vertex processing may refer to processing that is performed independently for each of the vertices that are processed. Per-vertex processing may include, for example, performing vertex transformations, performing lighting operations, performing fog operations, performing vertex shading, etc.

Geometry shader 18 may generate output primitives based on input primitives that are received by geometry shader 18 and based on a geometry shader program. The input primitives that are received by geometry shader 18 may be formed based the output vertices that are generated by vertex shader 16. From a programming perspective, in order to generate the output primitives, geometry shader 18 may execute a respective instance of the geometry shader program for each of the primitives that are received by geometry shader 18. In some examples, the geometry shader program may perform per-primitive processing on the input primitives to generate the output primitives. Per-primitive processing may refer to processing that is performed independently for each of the primitives that are processed. Per-primitive processing may include, for example, adding or deleting vertices, adding or deleting the number of primitives that are output by geometry shader 18 for each input primitive, etc.

Rasterizer 20 may generate source pixels based on the primitives received from geometry shader 18. For example, for each of the primitives received from geometry shader 18, rasterizer 20 may rasterize the primitive to generate a plurality of source pixels that correspond to the primitive. Rasterizing a primitive may involve, for example, performing scan conversion on the primitive to determine which pixels correspond to the primitive and/or interpolating attributes for the pixels that correspond to a primitive based on the attributes of the vertices of the primitive.

Pixel shader 22 may generate output source pixels based on input source pixels received from rasterizer 20 and based on a pixel shader program. From a programming perspective, in order to generate the output source pixels, pixel shader 22 may execute a respective instance of the pixel shader program for each of the pixels that are received from rasterizer 20. In some examples, the pixel shader program may perform per-pixel processing on the input source pixels to generate the output source pixels. Per-pixel processing may refer to processing that is performed independently for each of the pixels that are processed. Per-pixel processing may include, for example, performing pixel shading, performing texture mapping, etc.

Output merger 24 may generate destination pixels based on the source pixels received from pixel shader 22. In some examples, output merger 24 may merge each of the source pixels received from pixel shader 22 with a corresponding destination pixel stored in a render target to generate an updated version of the corresponding destination pixel. A destination pixel may correspond to a source pixel if the destination pixel has the same pixel location in the render target as the pixel location of the source pixel. To merge the source pixels with destination pixels, output merger 24 may perform one or more of a blending operation, a compositing operation, and a raster operation with respect to the source and destination pixels to be merged.

The resulting destination pixels are stored in a render target, which in some examples, may be a frame buffer. The render target may form part of resources block 12. The data stored in the render target may correspond to a rasterized, composited version of the primitives received by graphics pipeline 10.

As discussed above, from a programming perspective (e.g., from the perspective of the API), vertex shader programs are typically invoked by a graphics pipeline once for each incoming vertex and are configured to generate one output vertex for each invocation. Pixel shader programs are typically invoked once for each incoming pixel and are configured to generate one output pixel for each invocation. Geometry shader programs are typically invoked once for each incoming primitive (e.g., point, line, triangle), and are configured to generate zero, one, two or more output primitives for each invocation.

The programmable shader stages of graphics pipeline 10 are typically implemented on a GPU with one or more shader units. Each of the shader units may include a plurality of processing elements (e.g., arithmetic logic units (ALUs)) that execute a plurality of threads for a particular shader program in parallel. In some cases, the shader units may be single instruction, multiple data (SIMD) shader units where each of the processing elements in the shader unit executes the same instruction of a shader program at the same time with respect to different data.

Oftentimes, the same set of shader units may implement multiple different types of shader stages that are included in graphics pipeline 10. Prior to the development of geometry shaders, the only programmable processing stages in graphics rendering pipelines were typically vertex shaders and pixel shaders. Vertex shaders and pixel shaders operate under a single input/single output programming interface where a single input vertex or pixel is received for each shader invocation and a single output vertex or pixel is generated for each shader invocation. The single input/single output programming interface for both vertex and pixel shaders allows both types of shaders to be executed on a common hardware shader unit with a common single input/single output hardware interface.

One drawback of the single input/single output hardware interface for shader units, however, is that such an interface does not allow a vertex shader program to generate multiple vertices per invocation. This limits the flexibility of vertex shader programming models that can be implemented for a graphics rendering API.

Another drawback of the single input/single output hardware interface for shader units is that geometry shaders do not conform to such an interface. More specifically, geometry shaders are configured to output any number of primitives (within specified limits) for each input primitive received by the geometry shader, and each of the primitives may include any number of vertices. Thus, geometry shaders do not conform to the single input/single output programming interface. This makes it difficult to execute geometry shaders with vertex shaders and/or pixel shaders on a common hardware shader unit that implements a single input/single output hardware interface.

One solution to address the difficulty of geometry shader programming interfaces not conforming to a single input/single output hardware interface is to merge the vertex and geometry shader programs into a single, merged vertex/geometry shader program and to execute the merged vertex/geometry shader program as part of a common shader thread. The merged vertex/geometry shader program may include vertex shader functions that are specified by a vertex shader program followed by geometry shader functions that are specified by a geometry shader program. The merged vertex/geometry shader program may further include patch code that is inserted between the vertex shader functions and the geometry shader functions to properly manage the output data items generated by the vertex shader functions and the input data items received by the geometry shader functions.

To allow the merged vertex/geometry shader program to implement a single input/single output interface in the above-mentioned example, multiple instances of the merged vertex/geometry shader program may be instantiated for each of the primitives for which geometry shader processing is to be performed, and each of the instances of the merged vertex/geometry shader program may be configured to receive a single vertex and output a single vertex. The set of output vertices generated by the multiple instances of the merged vertex/geometry shader may collectively correspond to the vertices of an output primitive generated by one API instantiation of a geometry shader stage that is implemented by the merged vertex/geometry shader program.

For example, for each of the input primitives that are processed by a graphics processing pipeline, the merged vertex/geometry shader program may be instantiated N times where N is equal to the maximum number of output vertices per primitive specified by a geometry shader program that corresponds to the merged vertex/geometry shader program. A different one of the output vertices specified by the geometry shader program may be emitted by each of the different instantiations such that, collectively, the N instantiations of the merged vertex/geometry shader program output all of the output vertices defined by a geometry shader program that corresponds to the merged vertex/geometry shader program. Because each of the instantiations of the merged vertex/geometry shader program in this example receives a single input vertex and outputs a single output vertex, the merged vertex/geometry shader may be executed on a shader unit that implements a single input/single output hardware interface.

Graphics APIs (such as, e.g., DX 10 and DX 11) define the geometry shader stage as a stage that is executed once for each incoming primitive. For the merged vertex/geometry shader program execution techniques described above, however, N different instances of a merged vertex/geometry shader program may be executed for each incoming primitive. In other words, the geometry shader processing is effectively replicated N times for each API invocation of the geometry shader. Thus, the above-described technique for executing merged vertex/geometry shaders may be referred to as a replicated mode for executing merged vertex/geometry shaders.

One drawback of the replicated mode for executing merged vertex/geometry shaders is that the calculations performed by the geometry shader processing may be repeated for each instantiation of the merged vertex/geometry shader program. For example, in some cases, the geometry shader processing for a merged vertex/geometry shader program may contain a program control loop that causes the output vertices to be calculated in a particular order, and the geometry shader processing for the merged vertex/geometry shader program may, in some examples, operate using a waterfall mechanism. When the waterfall mechanism is used, for a given instantiation of the merged vertex/geometry shader program, the program control loop for the geometry shader functions may be performed for each of the output vertices until the particular vertex that is to be emitted by the particular instantiation is calculated. After the vertex that is to be emitted by the particular instantiation is calculated, the control flow for the geometry shader processing may cease executing the control loop.

In other words, when a waterfall mechanism is used, a first instance of the merged vertex/geometry shader program may execute a program control loop for the geometry shader functions one time and output a vertex that corresponds to the single iteration of the control loop, a second instance of the merged vertex/geometry shader program may execute the program control loop for the geometry shader functions two times and output a vertex that corresponds to the second iteration of the control loop, a third instance of the merged vertex/geometry shader program may execute the program control loop for the geometry shader functions three times and output a vertex that corresponds to the third iteration of the control loop, etc.

Using a waterfall mechanism may reduce some of the repeated calculations that occur when multiple instances of the merged vertex/geometry shader are instantiated for each primitive, but such a mechanism still results in repeated calculations. For example, the first vertex to be calculated by the geometry shader functions will be calculated N times, the second vertex will be calculated N-1 times, etc. Such repeated calculations of vertices may reduce the efficiency of the shader unit and/or increase the power consumption of the shader unit.

Another drawback of the replicated mode for executing merged vertex/geometry shaders is that resources (e.g., general purposes registers (GPRs)) need to be allocated for each invocation of the geometry shader resulting in repeated resource allocations. Repeated resource allocations may also reduce the efficiency of the shader unit and/or increase the power consumption of the shader unit.

A further drawback of the replicated mode for executing merged vertex/geometry shaders is that such a mode is not able to reuse vertices that are shared by multiple primitives in order to reduce the processing requirements for vertex shaders. Not allowing vertex reuse may increase power consumption and/or increase memory bandwidth usage.

According to some aspects of this disclosure, techniques are described for executing a shader program that performs vertex shader processing and that generates multiple output vertices for each input vertex that is received by the shader program. The plurality of output vertices may be generated based on program instructions contained in the shader program. Executing a shader program that performs vertex shader processing and that generates multiple output vertices for each of the input vertices that are received by a shader program may, for example, allow geometry shader processing to be performed with a merged vertex/geometry shader program without requiring replication of the geometry shader processing across multiple threads of execution for each API invocation of the geometry shader.

For example, a single instance of a merged vertex/geometry shader program may be invoked to perform the geometry shader processing for each API invocation of the geometry shader instead of N vertex/geometry shader instances as discussed above with respect to the replicated mode. The single instance of the merged vertex/geometry shader program may emit N vertices where N is the number of output vertices defined by a geometry shader program that corresponds to the merged vertex/geometry shader program. The N output vertices generated by a single instance of the merged vertex/geometry shader program may collectively correspond to the vertices of an output primitive generated by one API instantiation of a geometry shader stage that is implemented by the merged vertex/geometry shader program. In this way, a merged vertex/geometry shader may be executed by a shader unit without requiring replication of the geometry shader processing across multiple threads of execution. Because a single vertex/geometry shader instance may be invoked to perform the geometry shader processing for each API invocation of the geometry shader, this mode of executing a merged vertex/geometry shader may be referred to as a non-replicated mode for executing a merged vertex/geometry shader.

Allowing a merged vertex/geometry shader to be executed by a shader unit without requiring replication of the geometry shader processing may reduce the number of ALU computations needed per API invocation of the geometry shader, reduce the number of resources consumed by a GPU per API invocation of the geometry shader, and/or reduce the number of resource allocations that need to occur for each API invocation of the geometry shader. In this way, the performance of the GPU may be improved and/or the power consumption of the GPU may be reduced.

In addition, allowing a merged vertex/geometry shader to be executed by a shader unit without requiring replication of the geometry shader functions may allow vertex reuse to occur between primitives that share one or more vertices. Allowing shared vertices to be reused may save memory bandwidth and/or reduce power consumption.

Moreover, executing a shader program that generates multiple output vertices for each of the input vertices that are received by the shader program may increase the flexibility of vertex shader programming models that are used in graphics APIs. Typically, vertex shader programming models specify that a vertex shader program is to be invoked once for each input vertex and that the vertex shader program is to generate a single output vertex for each invocation of the vertex shader program. Executing a shader program that performs vertex shader processing and that generates multiple output vertices for each input vertex, however, may be used to implement a vertex shader programming model that allows multiple output vertices to be generated for each invocation of a vertex shader program. In this way, the flexibility of programmable vertex processing performed by a GPU may be improved.

Figure 2:
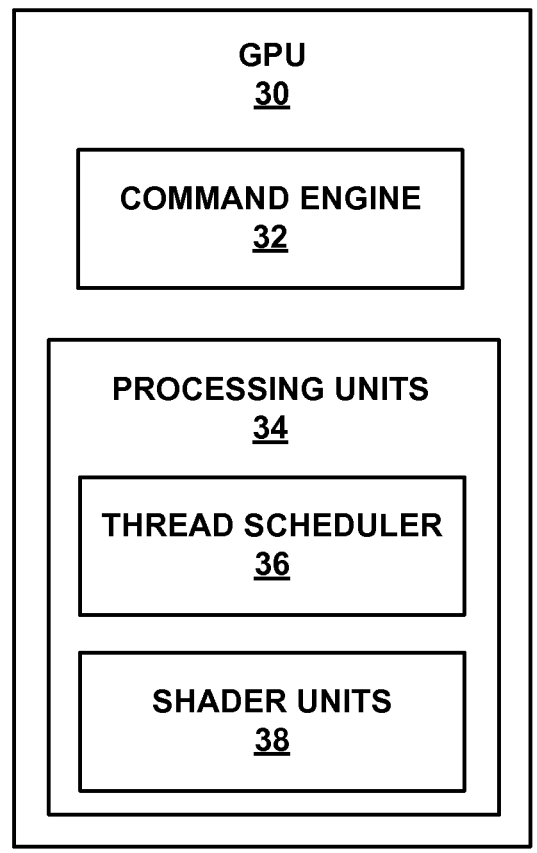
FIG. 2 is a block diagram of an example GPU that may be used to implement the shader program execution techniques of this disclosure.

FIG. 2 is a block diagram of an example graphics processing unit (GPU) 30 that may be used to implement the shader program execution techniques of this disclosure. GPU 30 is configured to perform graphics processing based on graphics commands, state information, and shader programs received from a host device (e.g., a host central processing unit (CPU)). GPU 30 may be an example of and alternatively referred to as a graphics processor. GPU 30 includes a command engine 32 and processing units 34.

In some examples, one or more of processing units 34 may be configurable to form a three-dimensional (3D) graphics rendering pipeline. For example, one or more of processing units 34 may be configurable to implement graphics pipeline 10 illustrated in FIG. 1.

Command engine 32 and processing units 34 may include any combination of dedicated hardware units, firmware, software, shader units, processors, and processing elements that are configured to perform the functions attributed to such components. In some examples, GPU 30 may be configured to execute instructions that cause one or more processors of GPU 30 to perform all or part of any of the techniques described in this disclosure.

Command engine 32 may receive commands and graphics data from a host device, manage the state of GPU 30 based on the commands, and control the operation of processing units 34 to render the graphics data based on the commands. For example, in response to receiving a draw call command, command engine 32 may control the operation of processing units 34 such that processing units 34 implement a graphics rendering pipeline (e.g., graphics pipeline 10 in FIG. 1), and cause graphics data to be rendered into a render target via the graphics rendering pipeline. As another example, command engine 32 may receive one or more shader programs from a host device, receive one or more commands instructing GPU 30 to load the shader programs onto GPU 30, and cause the shader programs to be loaded and/or stored in instruction caches associated with one or more shader units in GPU 30.

Each of processing units 34 may be a programmable processing unit or a fixed-function processing unit. A programmable processing unit may refer to a processing unit that is configured to execute a program (e.g., a shader program) which is defined by, compiled by, and/or loaded onto GPU 30 by a host device that uses GPU 30. A fixed-function processing unit may include hardware that is not configured to receive and execute programs from a host device. Although the hardware included in a fixed-function processing stage may be configurable, the configurability of the hardware is based on one or more control signals as opposed to being based on a program (e.g., a shader program).

As shown in FIG. 2, processing units 34 include thread scheduler 36 and shader units 38. In some examples, thread scheduler 36 may be a fixed-function processing unit. Although not specifically shown in FIG. 2, processing units 34 may include other fixed-function and/or programmable processing units that may be used to implement all or parts of a graphics rendering pipeline. For example, processing units 34 may include fixed-function processing units that are configured to implement input assembler 14, rasterizer 20 and output merger 24 in graphics pipeline 10 of FIG. 1.

Each of shader units 38 may be a programmable processing unit. In some examples, shader units 38 may implement one or more of the shader stages of a graphics rendering pipeline. For example, shader units 38 may implement vertex shader 16, geometry shader 18, and/or pixel shader 22 of graphics pipeline 10 shown in FIG. 1. In some examples, all or a subset of shader units 38 may be dedicated shader units that are configured to execute only specific types of shader programs that are implemented by a graphics rendering pipeline. In further examples, all or a subset of shader units 38 may be general shader units (e.g., unified shader units) that are configured to execute all or a subset of the types of shader programs that are implemented by a graphics rendering pipeline.

Thread scheduler 36 is configured to control how shader program threads are executed on shader units 38. Each of shader units 38 may be configured to execute a shader program that is loaded onto GPU 30 from a host device. A shader program may refer to a program that is executed by a programmable processing stage of GPU 30. In some cases, a shader program may be defined by a user-level graphics application executing on a host device and loaded onto GPU 30 by the host device. In additional cases, a shader program may be a compiled version of a source code shader program that is written in a high-level shading language, such as, e.g., a High Level Shading Language (HLSL), an OpenGL Shading Language (GLSL), a C for Graphics (Cg) shading language, etc.

Thread scheduler 36 may receive information indicative of one or more data items to be processed by one or more shader programs, determine a thread configuration for processing the data items, and cause shader units 38 to execute one or more threads for processing the data items based on the thread configuration. The data items may include, for example, one or more vertices to be processed by a shader program (e.g., a vertex shader program), one or more primitives to be processed by a shader program (e.g., a geometry shader program), and/or one or more vertices and one or more primitives to be processed by a shader program (e.g., a merged vertex/geometry shader program).

A thread may refer to an instance of a shader program that is executed by one of shader units 38 (e.g., executed by one of a plurality of processing elements included in a shader unit). Each of the instances of a particular shader program may execute the same instructions with respect to potentially different data items. For example, each of the instances of a vertex shader program may execute the same instructions with respect to a respective one of a plurality of vertices. As another example, each of the instances of a geometry shader program may execute the same instructions with respect to a respective one of a plurality of primitives. As a further example, each of the instances of a merged vertex/geometry shader program may execute the same instructions with respect to one or both of a respective one of a plurality of vertices and a respective one of a plurality of primitives. In some cases, the individual vertices and/or primitives executed by subsets of the instances of the merged vertex/geometry shader program may be the same.

A thread configuration may include information that assigns data items to be processed by a particular shader program to respective threads (e.g., instances) of the shader program that are to be executed by one or more of shader units 38. For example, for a vertex shader program, the thread configuration may include information that assigns a respective one of a plurality of vertices to each of the threads that are to be executed by one or more of shader units 38. As another example, for a geometry shader program, the thread configuration may include information that assigns a respective one of a plurality of primitives to each of the threads that are to be executed by one or more of shader units 38. As a further example, for a merged vertex/geometry shader program, the thread configuration may include information that assigns a respective one of a plurality of vertices and/or a respective one of a plurality of primitives to each of the threads that are to be executed by one or more of shader units 38. A merged vertex/geometry shader program may, for example, be assigned to both a vertex and a primitive, to only a vertex, or to only a primitive.

To cause one of shader units 38 to execute the threads based on the thread configuration, thread scheduler 36 may provide information indicative of a thread configuration to the shader unit. The information indicative of the thread configuration may include information indicative of assignments of data items to be processed by a particular shader program to respective threads of the shader program that are to be executed by the shader unit. The data items may include vertices, primitives, and/or pixels.

Each of shader units 38 may be configured to receive information indicative of a thread configuration for processing one or more data items, and to execute a plurality of instances of a shader program with respect to the data items based on the information indicative of the thread configuration received from thread scheduler 36. In some examples, each of shader units 38 may be further configured to allocate the registers in the respective shader unit based on the shader program to be executed by the respective shader unit and/or based on the thread configuration.

A wave may refer to a group of threads that are submitted to one of shader units 38 to be executed in parallel by the shader unit. In other words, the threads included in a wave may execute simultaneously on a shader unit. Each of the threads in a wave may correspond to a respective one of a plurality of instances of the same shader program. In some examples, each of the threads in a wave may be referred to as a fiber. The size of a wave may refer to the number of fibers that are included in a wave.

In examples where one of shader units 38 includes a plurality of single-instruction, multiple-data (SIMD) processing elements, the shader unit may execute the wave such that each of the fibers in the wave executes on a respective one of the plurality of SIMD processing elements. In such examples, the number of SIMD processing elements in the shader unit may be greater than or equal to the size of the waves (i.e., the number of fibers in the waves) that are executed by the shader unit.

In some examples, to determine the thread configuration for processing a particular set of data items with a shader program, thread scheduler 36 may determine a wave configuration for processing the set of data items. A wave configuration may include information that assigns data items to be processed by a particular shader program to respective threads that are included in a wave of threads to be executed in parallel on one of shader units 38. In such examples, the data indicative of the thread configuration provided by thread scheduler 36 to the shader unit may include data indicative of a wave configuration for processing the set of data items.

In some examples, thread scheduler 36 and/or shader units 38 may be configured to perform some or all of the techniques described in this disclosure. For example, thread scheduler 36 may be configured to determine thread configurations and/or wave configurations according to the techniques of this disclosure. As another example, each of shader units 38 may be configured to execute one or more threads and/or waves that are submitted to the respective shader unit according to the techniques of this disclosure. Further details regarding how thread scheduler 36 and shader units 38 operate will be described later in this disclosure after describing an example one of shader units 38 with respect to FIG. 3.

Figure 3:
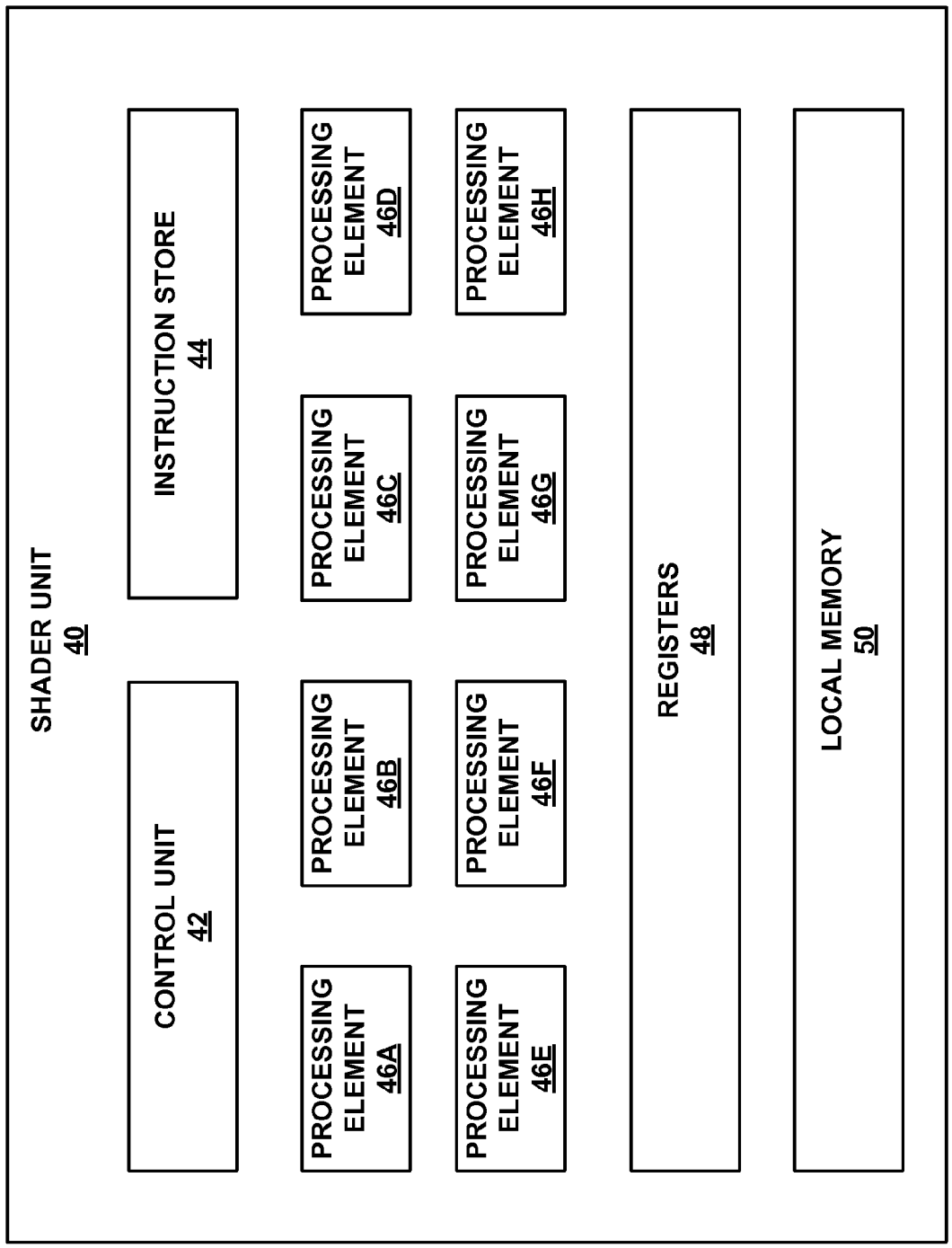
FIG. 3 is a block diagram illustrating an example shader unit that may be used in the GPU of FIG. 2.

FIG. 3 is a block diagram illustrating an example shader unit 40 that may be used in the GPU of FIG. 2. In some examples, shader unit 40 may correspond to one of shader units 38 shown in FIG. 2. Shader unit 40 is configured to execute one or more different types of shader programs based on information indicative of a thread configuration. Shader unit 40 includes a control unit 42, an instruction store 44, processing elements 46A-46H (collectively "processing elements 46"), registers 48 and a local memory 50.

Control unit 42 may receive information indicative of a thread configuration for processing data items, and cause one or more threads to execute on processing elements 46 based on a shader program and based on the information indicative of the thread configuration. The shader program may be stored in instruction store 44. The data items may be stored, for example, in registers 48, local memory 50 and/or an external memory. In some examples, control unit 42 may be further configured to allocate registers 48 to processing elements 46A-46H based on the shader program to be executed by shader unit 40 and/or based on the thread configuration.

Instruction store 44 is configured to store all or part of one or more shader programs (e.g., shader program instructions) that are to be executed by shader unit 40. Instruction store 44 may be any type of storage unit including, e.g., volatile memory, non-volatile memory, a cache, random access memory (RAM), static RAM (SRAM), dynamic RAM (DRAM), etc. When instruction store 44 is a cache, instruction store 44 may cache one or more shader programs that are stored in a memory external to shader unit 40. Although instruction store 44 is illustrated as being inside of shader unit 40, in other examples, instruction store 44 may be external to shader unit 40.

Processing elements 46 are configured to execute threads of a shader program. Each of processing elements 46 may execute a different thread. A thread may refer to an instance of a shader program that is executed with respect to a data item that is particular to the thread. Thus, each of processing elements 46 may be said to execute an instance of a shader program with respect to potentially different data items. The collection of threads that are executing in parallel on processing elements 46A-46H at a common point in time may be referred to as a wave of threads.

In the example shader unit 40 of FIG. 3, processing elements 46 may be single-instruction, multiple-data (SIMD) processing elements. SIMD processing elements refer to processing elements that, when activated, are configured to execute the same instruction at the same time with respect to different data. This may allow processing elements 46 to execute a plurality of threads of a shader program in parallel with respect to different data items. In some cases, each of processing elements 46 may execute instructions of a shader program based on a common program counter that points to an instruction contained in instruction store 44.

If one or more of processing elements 46 are deactivated, then such processing elements 46 do not execute a program instruction for a given instruction cycle. In some cases, control unit 42 may deactivate one or more of processing elements 46 to implement conditional branch instructions where the branching condition is satisfied for some threads and not satisfied for other threads.

In some examples, each of processing elements 46 may include and/or correspond to an arithmetic logic unit (ALU). In further examples, each of processing elements 46 may implement ALU functionality. ALU functionality may include addition, subtraction, multiplication, etc. In additional examples, each of processing elements 46 may be a scalar ALU or a vector ALU. A scalar ALU may operate on scalar data items, and a vector ALU may operate on vector data items. A scalar data item may include a single value corresponding to a single component for a scalar. A vector data item may include multiple values corresponding to the multiple components of a vector. In examples where processing elements 46 are scalar ALUs, if vector data items are processed by shader unit 40, each of the components of the vector may, in some examples, be processed in parallel by a subset of processing elements 46. For example, processing elements 46A, 46B, 46C, and 46D may process a four-component vector in parallel.

Each of processing elements 46 may read instructions from instruction store 44 and/or read data items from one or more of registers 48, local memory 50 and an external memory. Each of processing elements 46 may write output data to one or more of registers 48, local memory 50 and an external memory.

Registers 48 may be dynamically allocated to various processing elements 46. In some cases, some or all of registers 48 may serve as input registers and/or output registers for the various threads executing on shader unit 40. An input register may refer to a register that stores input data items (e.g., input vertices, input primitives) for a shader program, and an output register may refer to a register that stores output data items (e.g., output vertices, output primitives) for a shader program.

Local memory 50 may be any type of memory including, e.g., volatile memory, random access memory (RAM), static RAM (SRAM), dynamic RAM (DRAM), etc. In some examples, the address space for local memory 50 may be local to the processing elements 46 included in shader unit 40. In other words, other shader units and/or other portions of GPU 30 may not be able to directly access local memory 50. Similarly, a host device may not be able to directly access local memory 50. In some examples, local memory 50 may be implemented on the same chip as shader unit 40 and/or GPU 30.

The general operation of thread scheduler 36 and shader unit 40 will now be described. GPU 30 (e.g., command engine 32) loads a shader program into instruction store 44 or into a memory space that is accessible to instruction store 44. Thread scheduler 36 receives information indicative of one or more data items to process with a shader program, determines a thread configuration for executing the shader program with respect to the data items, and provides information indicative of the thread configuration to shader unit 40. The thread configuration may specify assignments of each of the data items to one or more instances of a shader program to be executed by shader unit 40. Each of the instances of the shader program may be configured to perform shader processing (e.g., execute the instructions of the shader program) with respect to the data items that are assigned to the respective instance of the shader program.

Control unit 42 receives the information indicative of the thread configuration, and causes processing elements 46A-46H to execute one or more instances of the shader program based on the thread configuration. To cause processing elements 46A-46H to execute one or more instances of the shader program based on the thread configuration, control unit 42 may load the input registers of processing elements 46A-46H with the input data items (e.g., input vertices) associated with the threads to be executed prior to executing the shader program instances. For example, one or more input registers may be allocated to each of processing elements 46A-46H, and for each of the instances of the shader program to be executed, control unit 42 may load the input registers that correspond to the respective shader instance with the input data items to be executed by the respective shader instance. In this way, a plurality of instances of a shader program may be executed by shader unit 40.

According to this disclosure, shader unit 40 may be configured to execute a shader program that performs vertex shader processing and that generates multiple output vertices for each input vertex that is received by the shader program. For example, shader unit 40 may execute a plurality of instances of the shader program such that each of the instances of the shader program receives a respective one of a plurality of input vertices and generates multiple output vertices in response to receiving the respective one of the plurality of input vertices. Each of the instances of the shader program may be executed by a respective one of processing elements 46A-46H.

Executing a shader program that generates multiple output vertices for each of the input vertices that are received by a shader program may, in some examples, allow the number of processing elements 46A-46H that are used to execute the shader program for a particular set of input vertices to be reduced. Reducing the number of processing elements 46A-46H that are used to execute a shader program may reduce the processing resources used by GPU 30 and/or reduce the power consumed by GPU 30. In this way, the performance and/or power consumption of GPU 30 may be improved.

Moreover, executing a shader program that generates multiple output vertices for each of the input vertices that are received by a shader program may, in further examples, be used to implement a vertex shader programming model that allows multiple output vertices to be generated for each invocation of a vertex shader program. Typically, vertex shader programming models specify that a vertex shader program is to be invoked once for each input vertex and that the vertex shader program is to generate a single output vertex for each invocation of the vertex shader program. Implementing a vertex shader programming model that allows multiple output vertices to be generated for each invocation of a vertex shader program may increase the flexibility of vertex shader programming that can be used by a graphics programmer.

In addition, executing a shader program that generates multiple output vertices for each of the input vertices that are received by a shader program may, in further examples, allow geometry shader processing for each of the primitives to be performed with a single instance of the merged vertex/geometry shader program per primitive. Allowing the geometry shader processing to be performed with a single instance of the merged vertex/geometry shader program per primitive may reduce the number of instances of the merged vertex/geometry shader program that are needed to process a particular set of primitives relative to techniques that require multiple instances of a merged vertex/geometry shader program to be executed for each primitive. Reducing the number of instances of a merged vertex/geometry shader program that are used to process primitives may reduce the processing resources used by GPU 30, reduce the number of resource allocations performed by GPU 30, and/or reduce the power consumed by GPU 30. In this way, the performance and/or power consumption of GPU 30 that performs programmable vertex shading and programmable geometry shading with merged vertex/geometry shader programs may be improved.

Figure 4:
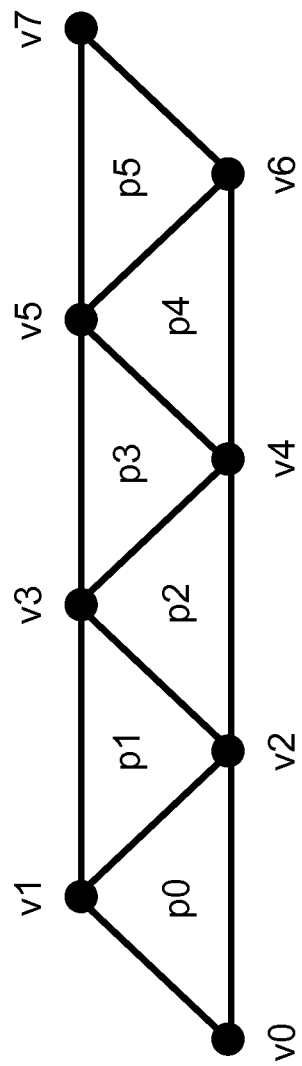
FIG. 4 is a conceptual diagram illustrating an example triangle strip that may be processed using the example shader program execution techniques of this disclosure.

FIG. 4 is a conceptual diagram illustrating an example triangle strip that may be processed using the example shader program execution techniques of this disclosure. As shown in FIG. 4, the example triangle strip includes eight vertices (v0, v1, v2, v3, v4, v5, v6, v7) and six primitives (p0, p1, p2, p3, p4, p5). Several of the primitives in the triangle strip of FIG. 4 share vertices. In other words, the same vertex may form part of two or more primitives.

Figure 5:
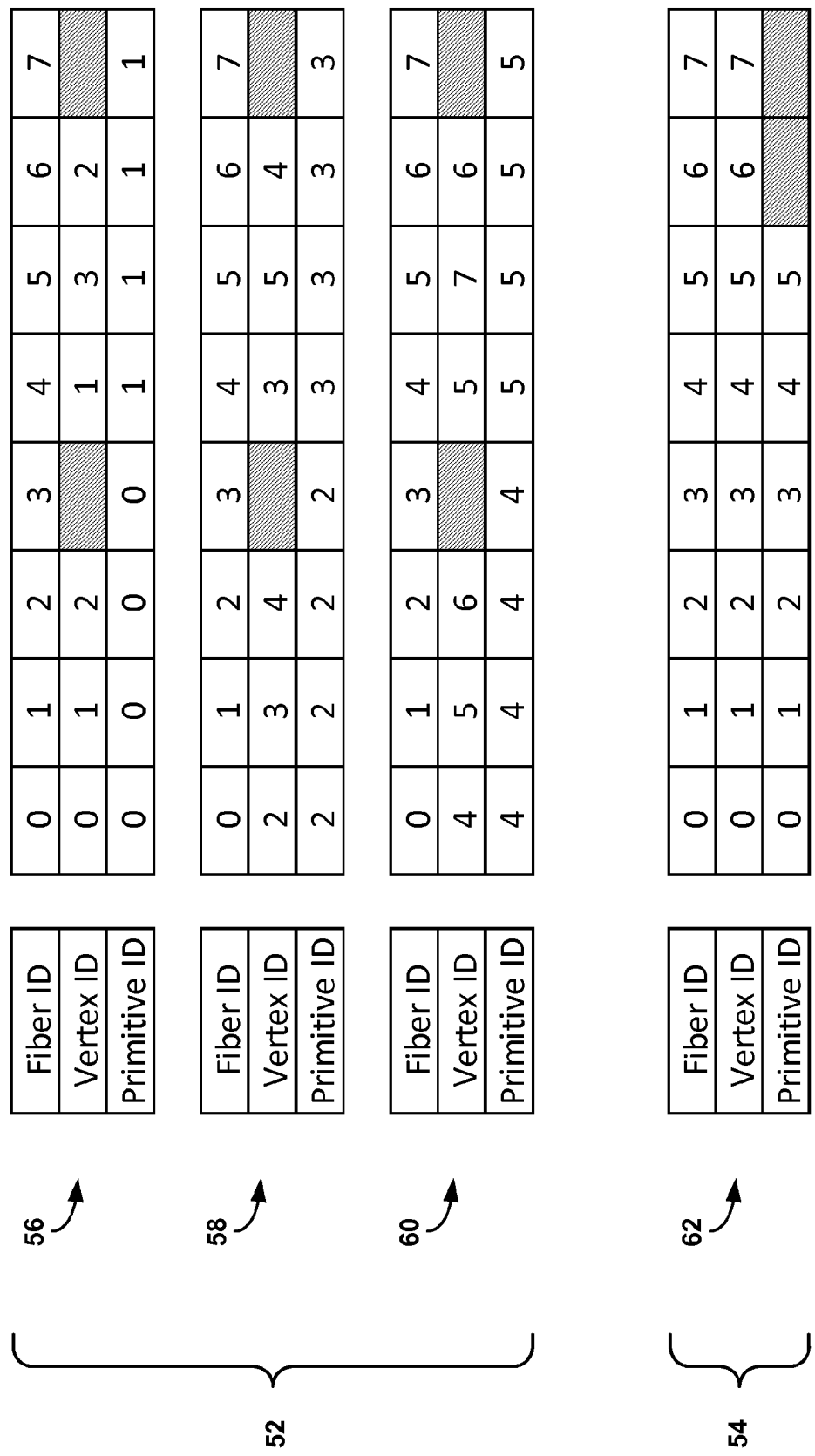
FIG. 5 is a conceptual diagram illustrating example thread configurations that may be used to execute a plurality of instances of a merged vertex/geometry shader program for processing the triangle strip shown in FIG. 4 according to this disclosure.

FIG. 5 is a conceptual diagram illustrating example thread configurations 52, 54 that may be used to execute a plurality of instances of a merged vertex/geometry shader program for processing the triangle strip shown in FIG. 4 according to this disclosure. Thread configuration 52 is an example of a thread configuration that may be used to execute a plurality of instances of a merged vertex/geometry shader program according to a replicated shader program execution mode. Thread configuration 54 is an example of a thread configuration that may be used to execute a plurality of instances of a merged vertex/geometry shader program according to a non-replicated shader program execution mode.

Thread configuration 52 includes wave configurations 56, 58, 60. Thread configuration 54 includes wave configuration 62. Each of wave configurations 56, 58, 60, 62 may correspond to a wave of instances of a merged vertex/geometry shader program that are processed in parallel by shader unit 40 (e.g., processing elements 46A-46H of shader unit 40). Each of wave configurations 56, 58, 60, 62 may be indicative of the assignment of data items to the instances of the merged vertex/geometry shader program included in the respective wave. Each of the instances of the merged vertex/geometry shader program in a single wave may be executed on a separate one of processing elements 46A-46H in shader unit 40. Each of the instances of the merged vertex/geometry shader program may be alternatively referred to as a thread and/or a fiber.

As shown in FIG. 5, the first row of each of wave configurations 56, 58, 60, 62 specifies a fiber identification (Fiber ID), the second row of each of wave configurations 56, 58, 60, 62 specifies a vertex identification (Vertex ID), and the third row of each of wave configurations 56, 58, 60, 62 specifies a primitive identification (Primitive ID). Each of the instances of the merged vertex/geometry shader program in a single wave may correspond to a unique, respective Fiber ID value. Each of the Vertex ID values corresponds to the similarly number vertex in the triangle strip of FIG. 4. Similarly, each of the Primitive ID values corresponds to the similarly number primitive in the triangle strip of FIG. 4.

Each of the columns of wave configurations 56, 58, 60, 62 represents an assignment of one or both of a vertex and a primitive to a particular fiber. For example, the first column of wave configuration 56 represents an assignment of vertex v0 and primitive p0 to fiber 0, and the sixth column of wave configuration 56 represents an assignment of vertex v3 and primitive p1 to fiber 5.

Boxes in wave configurations 56, 58, 60, 62 that do not include any value indicate that no data item of that particular type is assigned to the fiber. For example, the eighth column of wave configuration 56 represents an assignment of primitive p1 to fiber 7 and an assignment of no vertex to fiber 7, and the eighth column of wave configuration 62 represents an assignment of vertex v7 to fiber 7 and an assignment of no primitive to fiber 7.

When a vertex and a primitive are assigned to a fiber, the fiber may perform vertex shader processing with respect to the vertex assigned to the fiber and geometry shader processing with respect to the primitive assigned to the fiber. For example, fiber 0 in wave configuration 56 may perform vertex shader processing with respect to vertex v0 and geometry shader processing with respect to the primitive p0.

When a primitive is assigned to the fiber and a vertex is not assigned to the fiber, then the fiber may perform geometry shader processing with respect to the primitive and may not necessarily perform any vertex shader processing. For example, fiber 7 in wave configuration 56 may not perform any vertex shader processing and may perform geometry shader processing with respect to primitive p1.

When a primitive is assigned to a fiber and a vertex is not assigned to the fiber, then the fiber may perform geometry shader processing with respect to the primitive and may not necessarily perform any vertex shader processing. For example, fiber 7 in wave configuration 56 may not perform any vertex shader processing and may perform geometry shader processing with respect to primitive p1.

When a vertex is assigned to the fiber and a primitive is not assigned to the fiber, the fiber may perform vertex shader processing with respect to the vertex and may not necessarily perform any geometry shader processing. For example, fiber 7 in wave configuration 62 may perform vertex shader processing with respect to vertex v7 and may not perform any geometry shader processing.

For the replicated shader program execution mode (i.e., wave configurations 56, 58, 60), each of the fibers receives a single vertex and outputs a single vertex. Thus, multiple fibers perform the geometry shader processing for each of the primitives. In the specific example of FIG. 5, four fibers (i.e., four instances of the merged vertex/geometry shader) are executed for each primitive.

Note that this example could have used three fibers (i.e., the number of vertices included in each of the output primitives for the geometry shader stage) instead of four fibers. However, the geometry shader program defined the maximum output vertex count in this example to be four even though one of the output vertices is not used. In some examples, a geometry shader may define a maximum output vertex count to be between 1 and 1024 vertices. The maximum output vertex count may not necessarily be equal to the number of vertices of the input primitive type.

For the non-replicated mode (i.e., wave configuration 62), each of the fibers receives a single vertex and may output multiple vertices. Thus, for each of the primitives, a single fiber is used to perform the geometry shader processing for the primitive. In the example of FIG. 5, each fiber (e.g., instance of the merged vertex/geometry shader program) may output three vertices. Each set of three vertices output by each of the fibers may correspond to one of the triangle primitives shown in FIG. 4.

As shown in FIG. 5, for the replicated mode (i.e., wave configurations 56, 58, 60), the repeated execution of the geometry shader processing for each of the primitives causes repeated ALU operations and repeated resource allocations to occur. This may reduce the performance of GPU 30 and/or increase the power consumption of GPU 30. Moreover, the repeated execution of the geometry shader processing consumes multiple fibers/processing elements per primitive, which may further reduce the performance of GPU 30. In addition, vertices are not reused in the replicated mode, which prevents GPU 30 from leveraging the power, performance, and memory bandwidth improvements of vertex reuse.

In contrast, the non-replicated mode (i.e., wave configuration 62) executes a single instance of the geometry shader functions for each of the primitives processed by the geometry shader, which may reduce the number of ALU operations performed per primitive, reduce the number of resource allocations performed per primitive, and/or reduce the number of fibers/processing elements consumed per primitive. Reducing ALU operations per primitive, resource allocations per primitive, and/or fibers/processing elements consumed per primitive may improve the performance of the GPU and/or reduce the power consumption of the GPU. Moreover, vertex reuse may occur in the non-replicated mode, thereby reducing the amount of vertex processing that is performed per primitive. Reducing the amount of vertex processing may improve performance, save power and/or reduce memory bandwidth in a graphics processing system.

Although the non-replicated mode may provide several advantages in terms of improving the performance and power consumption of geometry shader processing and in terms of allowing vertex reuse to occur, there may be disadvantages to the non-replicated mode. For example, because each fiber can output multiple vertices, the total amount of on-chip storage space (e.g., registers 48 of shader unit 40) needed to store the output vertices for a single wave of vertex/geometry shader fibers may be significant, particularly in cases where the geometry shader performs a relatively large amount of vertex amplification. Although off-chip memory could be used to store vertices, using such memory may significantly degrade the performance of shader unit 40.

In the example of FIG. 5, each fiber is capable of outputting up to four vertices, resulting in on-chip storage space needing to be allocated for 32 vertices per wave. In contrast, the replicated mode outputs a single vertex per fiber. Thus, for a single wave, storage space may be limited in this example to eight vertices.

In general, the amount of storage space (e.g., registers 48) for storing output vertices in shader unit 40 may be limited. Because the non-replicated mode for executing merged vertex/geometry shader programs allows multiple vertices to be generated by each of the fibers, the amount of storage space needed to store output vertices for the non-replicated mode may be greater than that which is needed for the replicated mode. If the amount of storage space included in shader unit 40 is not sufficient to store the output vertices for a given set of fibers in a wave, then external memory accesses may need to be performed, which may significantly reduce the performance of shader unit 40.

As discussed above, the non-replicated mode for executing merged vertex/geometry shader programs may provide better performance and/or reduced power consumption for executing a given set of fibers in a wave. However, if output vertex storage space requirements associated with executing the fibers in the wave is greater than the amount of output vertex storage space available in shader unit 40, then the performance and/or power improvements achieved by not replicating the geometry shader processing may be outweighed by the reduction in performance caused by external memory accesses.

Thus, the non-replicated mode for executing merged vertex/geometry shader programs may provide better performance and/or reduced power consumption if storage space requirements for storing the output vertices are relatively small (e.g., if the output vertex storage space requirements are less than or equal to the amount of output vertex storage space contained in shader unit 40). On the other hand, the replicated mode for executing merged vertex/geometry shader programs may provide better performance if the storage space requirements for storing output vertices are relatively high (e.g., if the output vertex storage space requirements are greater than the amount of output vertex storage space contained in shader unit 40).

According to this disclosure, shader unit 40 may be configured to selectively switch between a non-replicated mode for executing merged vertex/geometry shader programs and a replicated mode for executing merged vertex/geometry shader programs. Allowing shader unit 40 to switch between a non-replicated mode and a replicated mode for executing merged vertex/geometry shader programs may provide additional control and/or flexibility to users of GPU 30 in order to choose particular execution modes that are tailored toward particular processing requirements, such as, e.g., performance requirements, power consumption requirements, etc.

In some examples, in order to switch between the non-replicated mode and the replicated mode for executing a merged vertex/geometry shader program, shader unit 40 may be configured to receive information indicative of a shader program execution mode to be used for executing a merged vertex/geometry shader program. The information indicative of a shader program execution mode to be used for executing a shader program may include, for example, information indicative of whether a non-replicated mode is to be used for executing the merged vertex/geometry shader program and/or information indicative of whether a replicated mode is to be used for executing the merged vertex/geometry shader program. In response to receiving information indicative of a shader program execution mode to be used for executing a merged vertex/geometry shader program, shader unit 40 (e.g., control unit 42) may configure one or more components in shader unit 40 based on the shader program execution mode to execute a merged vertex/geometry shader program based on the shader program execution mode.

In further examples, in order to switch between the non-replicated mode and the replicated mode for executing a merged vertex/geometry shader program, thread scheduler 36 may be configured to determine and/or generate a thread configuration based on the a selected shader program execution mode (e.g., the non-replicated mode or the replicated mode). For example, thread scheduler 36 may assign each of a plurality of primitives and a plurality of vertices to respective fibers, and generate a thread configuration based on the assignments. Thread scheduler 36 may submit the thread configuration to shader units 38 to cause shader units 38 to execute a merged vertex/geometry shader program based on the thread configuration.

In additional examples, in order to switch between the non-replicated mode and the replicated mode for executing a merged vertex/geometry shader program, the merged vertex/geometry shader program may include code that selectively performs various operations based on the selected shader program execution mode (e.g., replicated mode vs. non-replicated mode). For example, the shader code may selectively cause instances of the merged vertex/geometry shader to emit one vertex for the non-replicated mode and multiple vertices for the replicated mode. As another example, the shader code may selectively cause instances of the merged vertex/geometry shader to calculate local memory locations for storing and/or retrieving vertex-shaded vertices according to different techniques depending on the selected shader program execution mode.

For example, if the non-replicated mode is selected, thread scheduler 36 may generate the thread configuration such that each of a plurality of primitives is assigned to N fibers (per primitive) for geometry shader processing. On the other hand, if the replicated mode is selected, thread scheduler 36 may generate the thread configuration such that each of the plurality of primitives is assigned to one fiber (per primitive) for geometry shader processing.

In some examples, N may be an integer greater than or equal to 2. In further examples, N may be equal to a maximum output vertex count value that is specified by a geometry shader program that is implemented by the merged vertex/geometry shader program. The maximum output vertex count value may be indicative of a maximum number of output vertices that are to be generated by the geometry shader program for each primitive that is processed by the geometry shader program.

As another example, if the non-replicated mode is selected, thread scheduler 36 may generate the thread configuration such that each of the fibers emits and/or outputs one output vertex (per fiber). On the other hand, if the replicated mode is selected, thread scheduler 36 may generate the thread configuration such that each of the fibers emits and/or outputs M output vertices (per fiber).

In some examples, M may be an integer greater than or equal to 2. In further examples, M may be equal to how many vertices are generated for each of the primitives that are processed by a geometry shader stage that is implemented by the merged vertex/geometry shader program. In additional examples, M may be less than or equal to N.

As a further example, if the non-replicated mode is selected, thread scheduler 36 may generate the thread configuration such that each of a plurality of vertices is assigned to one fiber (e.g., one fiber per wave) for vertex shader processing. On the other hand, if the replicated mode is selected, thread scheduler 36 may generate the thread configuration such that each of a plurality of vertices is assigned to K fibers for vertex shader processing, where K is an integer equal to how many primitives contain the respective vertex.

In other words, if the non-replicated mode is selected, thread scheduler 36 may generate the thread configuration to allow vertex reuse, and if replicated mode is selected, thread scheduler 36 may generate the thread configuration to not allow for vertex reuse. Vertex reuse may refer to a processing techniques that allows instances of a shader program that performs geometry shader processing with respect to different primitives to use a vertex-shaded vertex that is generated by a single instance of a shader program that performs vertex shader processing.

For example, vertex reuse may occur when a first fiber performs vertex shader processing with respect to one of a plurality of vertices to generate a vertex-shaded vertex, a second fiber performs geometry shader processing with respect to a first primitive based on the vertex-shaded vertex generated by the first fiber, and a third fiber performs geometry shader processing with respect to a second primitive based on the vertex-shaded vertex generated by the first fiber. As shown in FIG. 4, vertex v1 is included in primitives p0 and p1, and as shown in FIG. 5, the geometry shader processing for fibers 0 and 1 may share vertex-shaded vertex v1, which is generated by fiber 1.

According to some aspects of this disclosure, the techniques for executing shader programs may include techniques for selecting between the non-replicated mode and the replicated mode for executing a merged vertex/geometry shader program and causing shader unit 40 to execute the merged vertex/geometry shader program according to the selected shader program execution mode. In some examples, the techniques for selecting between the non-replicated mode and the replicated mode may select between the non-replicated mode and the replicated mode based on information indicative of a total amount of storage space required to store output vertices associated with one or more API invocations of a geometry shader program that is implemented by the merged vertex/geometry shader program. A geometry shader program may be implemented by a merged vertex/geometry shader program if the compiled code for the merged vertex/geometry shader program is generated based on the geometry shader program.

In such examples, if the total amount of storage space required to store output vertices is relatively small (e.g., less than or equal to a threshold), then the techniques for selecting between the non-replicated mode and the replicated mode may select the non-replicated mode as the selected shader program execution mode for executing a merged vertex/geometry shader program. This may allow a graphics processing system to obtain the increased performance and/or reduced power consumption benefits of the non-replicated mode without requiring off-chip memory access for the vertex-shaded vertices. On the other hand, if the total amount of storage space required to store output vertices is relatively large (e.g., greater than a threshold), then the techniques for selecting between the non-replicated mode and the replicated mode may select the replicated mode as the selected shader program execution mode for executing the merged vertex/geometry shader program. This may allow a graphics processing system to avoid off-chip memory accesses that may be needed if the non-replicated mode were used in such cases and to avoid the performance drawbacks associated with such off-chip memory accesses.

In some examples, the total amount of storage space required to store the output vertices may be determined based on the total number of output vertices generated by one or more API invocations of the geometry shader program and the total amount of storage space required to store each of the output vertices. For example, the total amount of storage space required to store the output vertices may be equal to the product of the total amount of vertices generated by one or more API invocations of the geometry shader program and the total amount of storage space required to store each of the output vertices. In some cases, the total amount of vertices generated by one or more API invocations of the geometry shader program may correspond to the total number of vertices included in the set of output primitives generated by one or more API invocations of the geometry shader program.

In further examples, to select between the non-replicated mode and the replicated mode based on based on a total amount of storage space required to store output vertices associated with one or more API invocations of a geometry shader program, the techniques for selecting between the non-replicated mode and the replicated mode may determine the total amount of storage space required to store the output vertices for one wave of execution of the merged vertex/geometry shader program. One wave of execution of the merged vertex/geometry shader program may correspond to L instances of the merged vertex/geometry shader program that are executed in parallel by shader unit 40, where L is equal to the number of processing elements in shader unit 40 that execute a shader program in parallel.

In some examples, the information indicative of the total amount of storage space required to store the output vertices for one or more API invocations of the geometry shader program may correspond to the total amount of storage space required to store the output vertices for one wave of execution of the merged vertex/geometry shader program. One wave of execution of the merged vertex/geometry shader program may correspond to L instances of the merged vertex/geometry shader program that are executed in parallel by a shader unit 40, where L is equal to the number of processing elements in shader unit 40 that execute a shader program in parallel.

In such examples, if the total amount of storage space required to store output vertices is less than or equal to a threshold, then techniques for selecting between the non-replicated mode and the replicated mode may select the non-replicated mode as the selected shader program execution mode for executing a merged vertex/geometry shader program. On the other hand, if the total amount of storage space required to store output vertices is greater than a threshold, then the techniques for selecting between the non-replicated mode and the replicated mode may select the replicated mode as the selected shader program execution mode for executing the merged vertex/geometry shader program. In some cases, the threshold in such examples may correspond to the total amount of storage space available in a shader unit 40 (e.g., registers 48) to store output vertices associated with one wave of execution of the merged vertex/geometry shader program.

In additional examples, the information indicative of a total amount of storage space required to store output vertices associated with one or more API invocations of a geometry shader program may correspond to an amount of vertex amplification performed by an API invocation of a geometry shader program that is implemented by the merged vertex/geometry shader program. The amount of vertex amplification may refer to the ratio of output vertices to input vertices associated with one API invocation of a geometry shader program that is implemented by the merged vertex/geometry shader program.

In such examples, if the amount of vertex amplification is less than or equal to a threshold, then techniques for selecting between the non-replicated mode and the replicated mode may select the non-replicated mode as the selected shader program execution mode for executing a merged vertex/geometry shader program. On the other hand, if the amount of vertex amplification is greater than a threshold, then the techniques for selecting between the non-replicated mode and the replicated mode may select the replicated mode as the selected shader program execution mode for executing the merged vertex/geometry shader program.

In some examples, one or more of the techniques described above for selecting between the non-replicated mode and the replicated mode for executing a merged vertex/geometry shader program may be implemented by a host device (e.g. a host central processing unit (CPU)) that is external to GPU 30. For example, one or more of the techniques for selecting between the non-replicated mode and the replicated mode may be implemented by a graphics driver executing on a host device and/or implemented by a compiler executing on a host device. In further examples, one or more of the techniques for selecting between the non-replicated mode and the replicated mode may be implemented by GPU 30. For example, one or more fixed-function and/or programmable processing units may implement one or more of the above-described selection techniques.

In examples where the selection techniques are implemented by a host device. The techniques of this disclosure may provide GPU 30 with information indicative of the selected shader program execution mode to GPU 30. For example, GPU 30 may include one or more registers that are used to store information (e.g., one or more bits and/or one or more values) indicative of the selected shader program execution mode, and the host device (e.g., a CPU) may provide the information indicative of the selected shader program execution mode to GPU 30 by writing one or more values indicative of the selected shader program execution mode to the registers.

Figure 6:
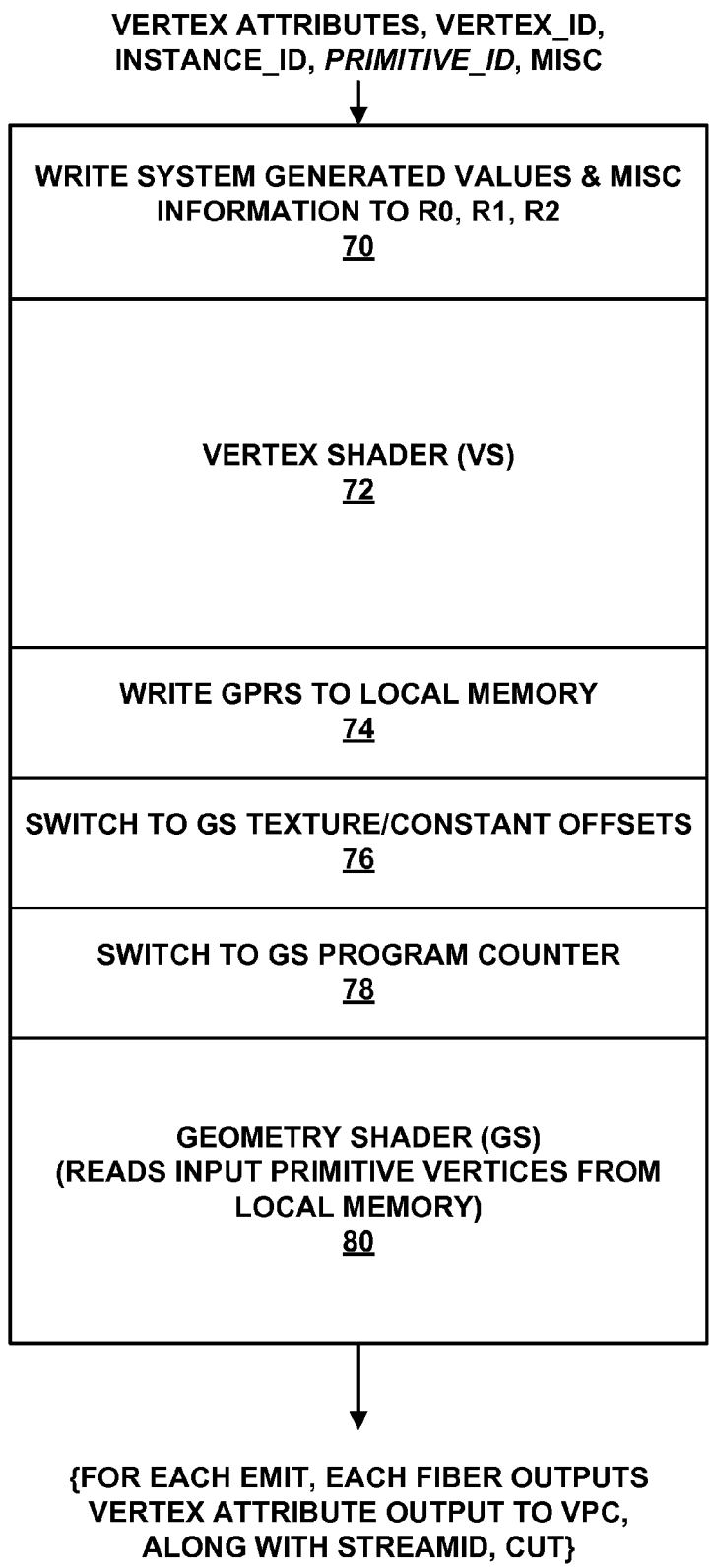
FIG. 6 is a conceptual diagram illustrating example processing flow associated with executing a merged vertex/geometry shader program according to this disclosure.

FIG. 6 is a conceptual diagram illustrating example processing flow associated with executing a merged vertex/geometry shader program according to this disclosure. FIG. 7 illustrates pseudo code associated with executing a merged vertex/geometry shader program according to this disclosure. In general the flow of operations depicted in FIG. 6 may correspond to the instructions illustrated in FIG. 7.

In the example shown in FIG. 6, shader unit 40 writes system values such as vertex attributes, vertex_id, instance_id, primitive_id, misc to a series of registers R0, R1, and R2 (70). In some examples, the registers may correspond to registers 48 of shader unit 40. Typically, system values may be stored to any otherwise unallocated memory of GPU 30. By storing the system generated values to a series of registers in a predetermined location, shader unit 40 may access the system generated values for each of the vertex shader processing stage and the geometry shader processing stage. Thus, the user-specified geometry shader program does not need to be complied based on the user-specified vertex shader program in order to determine where system generated values have been stored. Rather, GPU 30 may access predetermined memory locations when performing each of the vertex shader processing and the geometry shader processing to access the system generated values.

Shader unit 40 performs vertex shading operations (72). Following the vertex shading operations, shader unit 40 writes the contents of general purpose registers (GPRs) (e.g., registers 48) (e.g., an output vertex from the vertex shader processing) to local memory 50 (74). Shader unit 40 switches to geometry shader texture and constant offsets (76) and a geometry shader program counter (78).

Shader unit 40 reads the contents of local memory 50 (e.g., vertex-shaded vertices generated by the vertex shader processing of one or more instances of the merged vertex/geometry shader program), and performs geometry shading operations (80). When operating according to the non-replicated mode, for each emit included in a fiber (e.g., an instance of the merged vertex/geometry shader program), shader unit 40 may output a vertex attribute to a vertex parameter cache (VPC), a stream_id, and any cut indications. When operating according to the replicated mode, shader unit 40 may output one vertex attribute to a vertex parameter cache (VPC), as well as an indication of the position of the geometry shaded vertices, a stream_id, any cut indications, and any interpreted values to a position cache.

Referring to FIG. 7, a merged vertex/geometry shader program may include vertex shader processing code 82, geometry shader processing code 84 and patch code 86. A compiler (e.g., executing on a host CPU) may generate a merged vertex/geometry shader program based on a vertex shader program and a geometry shader program that are specified by a graphics application. In some examples, the vertex shader program and the geometry shader program may be independently compiled prior to the generating the merged vertex/geometry shader program, and the compiler may append the compiled geometry shader processing code 84 to the compiled vertex shader processing code 82 to generate the compiled code for the merged vertex/geometry shader program.

As shown in FIG. 7, the compiler may insert patch code 86 between vertex shader processing code 82 and geometry shader processing code 84. Patch code 86 may cause shader unit 40 to store the output vertex generated by vertex shader processing code 82 into registers 48 of shader unit 40, and to perform operations associated with switching shader unit 40 from a vertex shader processing mode to a geometry shader processing mode. The operations associated with switching shader unit 40 from a vertex shader processing mode to a geometry shader processing mode may include a CHMSK operation and a CHSH operation. The CHMSK operation may switch the resource pointer in shader unit 40 to a geometry shader resource offset. The CHSH operation may switch the program counter in shader unit 40 to a program counter value associated with geometry shader processing code 84.

According to additional aspects of this disclosure, a compiler may generate compiled code for a merged vertex/geometry shader program such that the compiled codes includes instructions that cause shader unit 40 to selectively execute the merged vertex/geometry shader program according to the non-replicated mode or the replicated mode based on information indicative of a mode to be used for execution of the merged vertex/geometry shader program. For example, as shown in FIG. 7, a compiler may generate the compiled code for the merged vertex/geometry shader such that the compiled code includes code segments 88, 90 and 92. Each of code segments 88, 90, 92 may selectively perform various operations based on the selected shader program execution mode (e.g., replicated mode vs. non-replicated mode) in order to cause shader unit 40 to operate according to the selected shader program execution mode.

Code segment 88 may include instructions that cause shader unit 40 to selectively use one of a first local memory address calculation formula and a second set local memory address calculation formula based on a selected shader program execution mode. The selected local memory address calculation formula may be used to determine which location in local memory 50 to store the output of the vertex shader processing (e.g., a vertex-shaded vertex) performed by the merged vertex/geometry shader program. For example, if the non-replicated mode is selected as the shader program execution mode, the compiled code may cause shader unit 40 to use a first local memory address calculation formula that calculates the local memory address based on the fiber identification value (i.e., fiber_id_vertex) for the currently executing fiber and the size of the output vertex (i.e., VERT_SIZE). On the other hand, if the replicated mode is selected as the shader program execution mode, the compiled code may cause shader unit 40 to use a second local memory address calculation formula that calculates the local memory address based on the primitive identification value of the primitive assigned to the currently executing fiber (i.e., rel_primID), the size of the primitive (i.e., PRIM_SIZE), the vertex identification value of the vertex assigned to the currently executing fiber (i.e., rel_vertex), and the size of the output vertex (i.e., VERT_SIZE).

Code segment 90 may include instructions that cause shader unit 40 to selectively use one of a first local memory address calculation formula and a second set local memory address calculation formula based on a selected shader program execution mode. The selected local memory address calculation formula may be used to determine from which location in local memory 50 to load input vertices (e.g., vertex-shaded vertices) associated with the geometry shader processing performed by the merged vertex/geometry shader program. For example, if the non-replicated mode is selected as the shader program execution mode, the compiled code may cause shader unit 40 to use a first local memory address calculation formula that calculates the local memory address based on a vertex identification value (i.e., vertex_id associated with the vertex to be loaded and a size of the vertices to be loaded (i.e., VERT_SIZE). On the other hand, if the replicated mode is selected as the shader program execution mode, the compiled code may cause shader unit 40 to use a second local memory address calculation formula that calculates the local memory address based on the primitive assigned to the currently executing fiber (i.e., rel_primID), the size of the primitive (i.e., PRIM_SIZE), the vertex identification value (i.e., rel_vertex) associated with the vertex to be loaded, and the size of the vertex (i.e., VERT_SIZE).

Code segment 92 may include instructions that cause shader unit 40 to output one vertex or multiple vertices based on a selected shader program execution mode. For example, if the non-replicated mode is selected as the shader program execution mode, the compiled code may cause shader unit 40 to emit multiple vertices for each instance of the merged geometry shader program. On the other hand, if the replicated mode is selected as the shader program execution mode, the compiled code may cause shader unit 40 to emit a single vertex for each instance of the merged geometry shader program. The single vertex that is emitted may correspond to the vertex where Gsoutcount==GsoutvertID.

As shown in FIG. 7, code segments 88 and 90 may receive a "misc→reuse" parameter, which may correspond to the information indicative of a mode to be used for execution of the shader program. Similarly, code segment 92 may receive an "optimized_mode" parameter, which may correspond to the information indicative of a mode to be used for execution of the merged vertex/geometry shader program. In some examples, the "misc→reuse" parameter may be generated by GPU 30, and the "optimized_mode" parameter may be generated by a GPU driver, and provided to GPU 30. In some examples, the "misc→reuse" parameter and the "optimized_mode" parameter may be implemented as and/or generated by a single parameter that is indicative of a mode to be used for execution of the merged vertex/geometry shader program.

Placing instructions in the compiled code for the merged vertex/geometry shader program that are capable selectively executing either mode may allow the processing mode of shader unit 40 to be changed without having to reload a new shader program into the shader unit. Moreover, placing instructions in the compiled code for the merged vertex/geometry shader program that are capable selectively executing either mode may also simplify the compilation of the merged vertex/geometry shader program.

Figure 8:
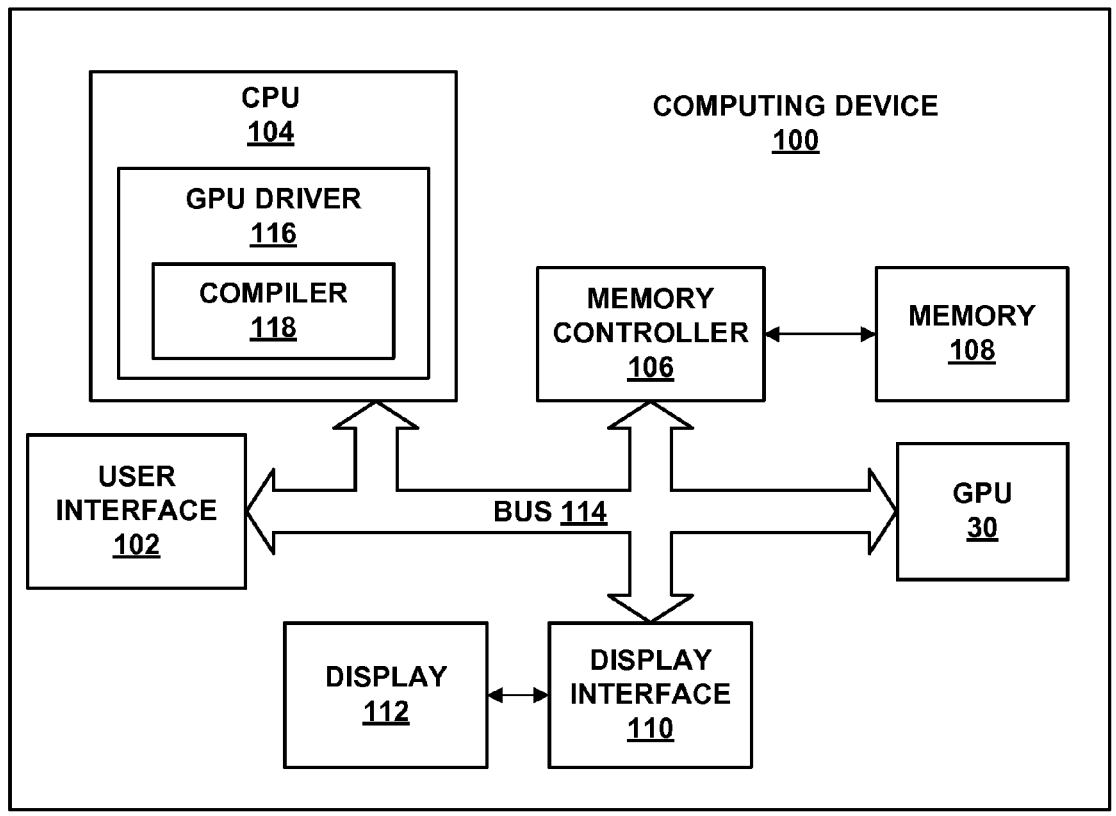
FIG. 8 is a block diagram illustrating an example computing device that may be used to implement the shader program execution techniques of this disclosure.

FIG. 8 is a block diagram illustrating an example computing device 100 that may be used to implement the shader program execution techniques of this disclosure. Computing device 100 may comprise a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 8, computing device 100 includes a user interface 102, a CPU 104, a memory controller 106, a memory 108, a GPU 30, a display interface 110, a display 112 and a bus 114. User interface 102, CPU 104, memory controller 106, GPU 30 and display interface 110 may communicate with each other using bus 114. In some examples, GPU 30 may correspond to GPU 30 illustrated in FIG. 2. It should be noted that the specific configuration of buses and communication interfaces between the different components shown in FIG. 8 is merely exemplary, and other configurations of computing devices and/or other graphics processing systems with the same or different components may be used to implement the techniques of this disclosure.

CPU 104 may comprise a general-purpose or a special-purpose processor that controls operation of computing device 100. A user may provide input to computing device 100 to cause CPU 104 to execute one or more software applications. The software applications that execute on CPU 104 may include, for example, a graphics application, a word processor application, an email application, a spread sheet application, a media player application, a video game application, a graphical user interface application, an operating system, or any other type of program. The user may provide input to computing device 100 via one or more input devices (not shown) such as a keyboard, a mouse, a microphone, a touch pad or another input device that is coupled to computing device 100 via user interface 102.

The software applications that execute on CPU 104 may include one or more graphics rendering instructions that instruct GPU 30 to render graphics data to a frame buffer for display on display 112. In some examples, the graphics rendering instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 104 may issue one or more graphics rendering commands to GPU 30 to cause GPU 30 to perform some or all of the rendering of the graphics data. In some examples, the graphics data to be rendered may include a list of graphics primitives, e.g., points, lines, triangles, quadrilaterals, triangle strips, etc.

As shown in FIG. 8, CPU 104 includes a GPU driver 116 and a compiler 118. GPU driver 116 may receive instructions from a software application (e.g., a graphics application), and control the operation of GPU 30 to service the instructions. For example, GPU driver 116 may formulate one or more commands, place the commands into memory 108, and instruct GPU 30 to execute the commands.

Compiler 118 may receive source code for one or more different types of shader programs and generate compiled source code for the shader programs. For example, compiler 118 may receive source code for a vertex shader program and source code for a geometry shader program, generate compiled code for the vertex shader program based on the source code for the vertex shader program, and generate compiled code for the geometry shader program based on the source code for the geometry shader program. Compiler 118 may also generate a merged vertex/geometry shader program based on the compiled code for the vertex shader program and the geometry shader program. GPU driver 116 may load one or more of the compiled shader programs onto GPU 30 (e.g., instruction store 44 of shader unit 40) for execution by shader unit 40 of GPU 30.

Memory controller 106 facilitates the transfer of data going into and out of memory 108. For example, memory controller 106 may receive memory read and write commands, and service such commands with respect to memory 108 in order to provide memory services for the components in computing device 100. Memory controller 106 is communicatively coupled to memory 108. Although memory controller 106 is illustrated in the example computing device 100 of FIG. 8 as being a processing module that is separate from both CPU 104 and memory 108, in other examples, some or all of the functionality of memory controller 106 may be implemented on one or both of CPU 104 and memory 108.

Memory 108 may store program modules and/or instructions that are accessible for execution by CPU 104 and/or data for use by the programs executing on CPU 104. For example, memory 108 may store program code and graphics data associated with the applications executing on CPU 104. Memory 108 may additionally store information for use by and/or generated by other components of computing device 100. For example, memory 108 may act as a device memory for GPU 30 and may store data to be operated on by GPU 30 as well as data resulting from operations performed by GPU 30. For example, memory 108 may store any combination of texture buffers, depth buffers, stencil buffers, vertex buffers, frame buffers, render targets, or the like. In addition, memory 108 may store command streams for processing by GPU 30. Memory 108 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

GPU 30 may be configured to execute commands that are issued to GPU 30 by CPU 104. The commands executed by GPU 30 may include graphics commands, draw call commands, GPU state programming commands, timestamp requests, memory transfer commands, general-purpose computing commands, kernel execution commands, etc.

In some examples, GPU 30 may be configured to perform graphics operations to render one or more graphics primitives to display 112. In such examples, when one of the software applications executing on CPU 104 requires graphics processing, CPU 104 may provide graphics data to GPU 30 and issue one or more graphics commands to GPU 30. The graphics commands may include, e.g., draw call commands, GPU state programming commands, memory transfer commands, blitting commands, etc. The graphics data may include vertex buffers, texture data, surface data, etc. In some examples, CPU 104 may provide the commands and graphics data to GPU 30 by writing the commands and graphics data to memory 108, which may be accessed by GPU 30.

In further examples, GPU 30 may be configured to perform general-purpose computing for applications executing on CPU 104. In such examples, when one of the software applications executing on CPU 104 decides to off-load a computational task to GPU 30, CPU 104 may provide general-purpose computing data to GPU 30, and issue one or more general-purpose computing commands to GPU 30. The general-purpose computing commands may include, e.g., kernel execution commands, memory transfer commands, etc. In some examples, CPU 104 may provide the commands and general-purpose computing data to GPU 30 by writing the commands and data to memory 108, which may be accessed by GPU 30.

GPU 30 may, in some instances, be built with a highly-parallel structure that provides more efficient processing of vector operations than CPU 104. For example, GPU 30 may include a plurality of processing elements that are configured to operate on multiple vertices, control points, pixels and/or other data in a parallel manner. The highly parallel nature of GPU 30 may, in some instances, allow GPU 30 to render graphics images (e.g., GUIs and two-dimensional (2D) and/or three-dimensional (3D) graphics scenes) onto display 112 more quickly than rendering the images using CPU 104. In addition, the highly parallel nature of GPU 30 may allow GPU 30 to process certain types of vector and matrix operations for general-purpose computing applications more quickly than CPU 104.

GPU 30 may, in some instances, be integrated into a motherboard of computing device 100. In other instances, GPU 30 may be present on a graphics card that is installed in a port in the motherboard of computing device 100 or may be otherwise incorporated within a peripheral device configured to interoperate with computing device 100. In further instances, GPU 30 may be located on the same microchip as CPU 104 forming a system on a chip (SoC). GPU 30 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 30 may include a GPU cache, which may provide caching services for all or a portion of memory 108. In such examples, GPU 30 may use the cache to process data locally using a local storage, instead of off-chip memory. This allows GPU 30 to operate in a more efficient manner by reducing the need for GPU 30 to access memory 108 via bus 114, which may experience heavy bus traffic, during each read and write command. In some examples, however, GPU 30 may not include a separate cache, but instead utilize memory 108 via bus 114. The GPU cache may include one or more volatile or non-volatile memories or storage devices, such as, e.g., random access memory (RAM), static RAM (SRAM), dynamic RAM (DRAM), etc.

CPU 104 and/or GPU 30 may store rasterized image data in a frame buffer that is allocated within memory 108. Display interface 110 may retrieve the data from the frame buffer and configure display 112 to display the image represented by the rasterized image data. In some examples, display interface 110 may include a digital-to-analog converter (DAC) that is configured to convert the digital values retrieved from the frame buffer into an analog signal consumable by display 112. In other examples, display interface 110 may pass the digital values directly to display 112 for processing.

Display 112 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 112 may be integrated within computing device 100. For instance, display 112 may be a screen of a mobile telephone handset or a tablet computer. Alternatively, display 112 may be a stand-alone device coupled to computer device 2 via a wired or wireless communications link. For instance, display 112 may be a computer monitor or flat panel display connected to a personal computer via a cable or wireless link.

Bus 114 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 114 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

According to this disclosure, computing device 100 (e.g., CPU 104 and/or GPU 30) may be configured to perform any of the shader program execution techniques described in this disclosure. For example, GPU 30 (e.g., shader unit 40 of GPU 30) may be configured to execute a shader program that performs vertex shader processing and that generates multiple output vertices for each input vertex that is received by the shader program according to one or more of the techniques described in this disclosure. As another example, GPU 30 may be configured to execute a merged vertex/geometry shader program according to one or both of the replicated mode of execution and the non-replicated mode of execution as described in this disclosure. As a further example, GPU 30 may be configured to selectively switch between using the replicated mode and the non-replicated mode for execute a merged vertex/geometry shader program according to one or more of the techniques described in this disclosure.

In additional examples, CPU 104, compiler 118, and/or GPU 30 may be configured to select between the non-replicated mode and the replicated mode for executing a merged vertex/geometry shader program and cause a shader unit in GPU 30 to execute the merged vertex/geometry shader program according to the selected shader program execution mode according to one or more of the techniques described in this disclosure. In further examples, CPU 104, compiler 118, and/or GPU 30 may be configured to generate compiled code for a merged vertex/geometry shader program according to one or more of the techniques described in this disclosure. For example, CPU 104, compiler 118, and/or GPU 30 may generate the compiled code such that the compiled code includes instructions that cause a shader unit to selectively execute a merged vertex/geometry shader program according to the non-replicated mode or the replicated mode based on information indicative of a mode to be used for execution of the shader program.

Figure 9:
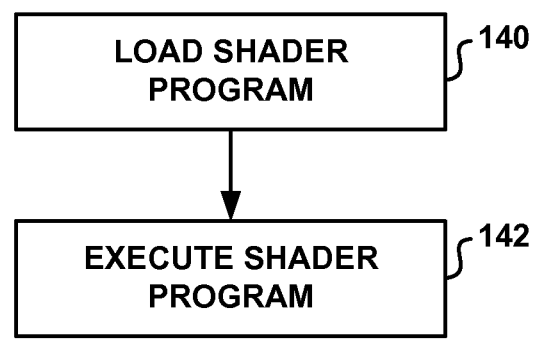
FIG. 9 is a flow diagram illustrating an example technique for executing a shader program according to this disclosure.

FIG. 9 is a flow diagram illustrating an example technique for executing a shader program according to this disclosure. CPU 104 (e.g., GPU driver 116) may load a shader program onto GPU 30 (140). The shader program my perform vertex shader processing and may generate multiple output vertices for each input vertex that is received by the shader program. GPU 30 (e.g., shader unit 40) may execute the shader program that performs vertex shader processing and that generates multiple output vertices for each input vertex that is received by the shader program (142).

In some examples, GPU 30 (e.g., shader unit 40) may execute a plurality of instances of the shader program such that each of the instances of the shader program receives a respective one of a plurality of input vertices and generates multiple output vertices in response to receiving the respective one of the plurality of input vertices. In some cases, GPU 30 (e.g., shader unit 40) may execute the plurality of instances of the shader program in parallel and/or as part of a wave of execution. In some examples, executing the instances in parallel may include executing the instances such that each of the instances executes on a respective one of a plurality of processing elements in a shader unit at the same time with respect to different data items.

In further examples, the shader program that performs vertex shader processing and that generates multiple output vertices for each input vertex that is received by the shader program may be a merged vertex/geometry shader program. The merged vertex/geometry shader program may be configurable to perform vertex shader processing and geometry shader processing. The vertex shader processing may be specified by a vertex shader program and the geometry shader processing may be specified by a geometry shader program.

In some examples, GPU 30 (e.g., shader unit 40) may execute a plurality of instances of the merged vertex/geometry shader program such that each of the instances of the merged vertex/geometry shader program generates M output vertices, where M is an integer greater than or equal to two. In some examples, M may be equal to a maximum output vertex count value that is specified by a geometry shader program that is implemented by the merged vertex/geometry shader program. The maximum output vertex count value may be indicative of a maximum number of output vertices that are to be generated by the geometry shader program for each primitive that is processed by the geometry shader program. A geometry shader program may be implemented by a merged vertex/geometry shader program if the compiled code for the merged vertex/geometry shader program is generated based on the geometry shader program.

In further examples, each of the instances of the merged vertex/geometry shader program may be configurable to perform the geometry shader processing with respect to a primitive that is assigned to the respective instance of the merged vertex/geometry shader program. In such examples, each of a plurality of primitives may be assigned to one merged vertex/geometry shader instance for processing (e.g., one merged vertex/geometry shader instance per primitive and/or one merged vertex/geometry shader instance per wave).

In some examples, each of the instances of the merged vertex/geometry shader program may be configurable to perform the geometry shader processing with respect to a primitive that is assigned to the respective instance of the merged vertex/geometry shader program and to perform vertex shader processing with respect to a vertex that is assigned to the respective instance of the merged vertex/geometry shader program. In such examples, each of a plurality of primitives may be assigned to one merged vertex/geometry shader instance for processing (e.g., one merged vertex/geometry shader instance per primitive and/or one merged vertex/geometry shader instance per wave), and each of a plurality of vertices may be assigned to one merged vertex/geometry shader instance for processing (e.g., one merged vertex/geometry shader instance per vertex and/or one merged vertex/geometry shader instance per wave). In some cases, at least one of the instances of the merged vertex/geometry shader program may be configured to perform vertex shader processing with respect to one of the plurality of vertices and geometry shader processing with respect to one of the plurality of primitives.

In some examples, shader unit 40 may allow vertices that are shared between primitives to be reused. For example, shader unit 40 may execute a first instance, a second instance, and a third instance of the merged vertex/geometry shader program. The first instance of the merged vertex/geometry shader program may perform the vertex shader processing with respect to one of a plurality of vertices to generate a vertex-shaded vertex. The second instance of the merged vertex/geometry shader program may perform the geometry shader processing with respect to a first primitive of the plurality of primitives based on the vertex-shaded vertex generated by the first instance of the merged vertex/geometry shader program to generate one or more geometry-shaded vertices that correspond to the first primitive. The third instance of the merged vertex/geometry shader program may perform the geometry shader processing with respect to a second primitive of the plurality of primitives based on the vertex-shaded vertex generated by the first instance of the merged vertex/geometry shader program to generate one or more geometry-shaded vertices that correspond to the second primitive.

Figure 10:
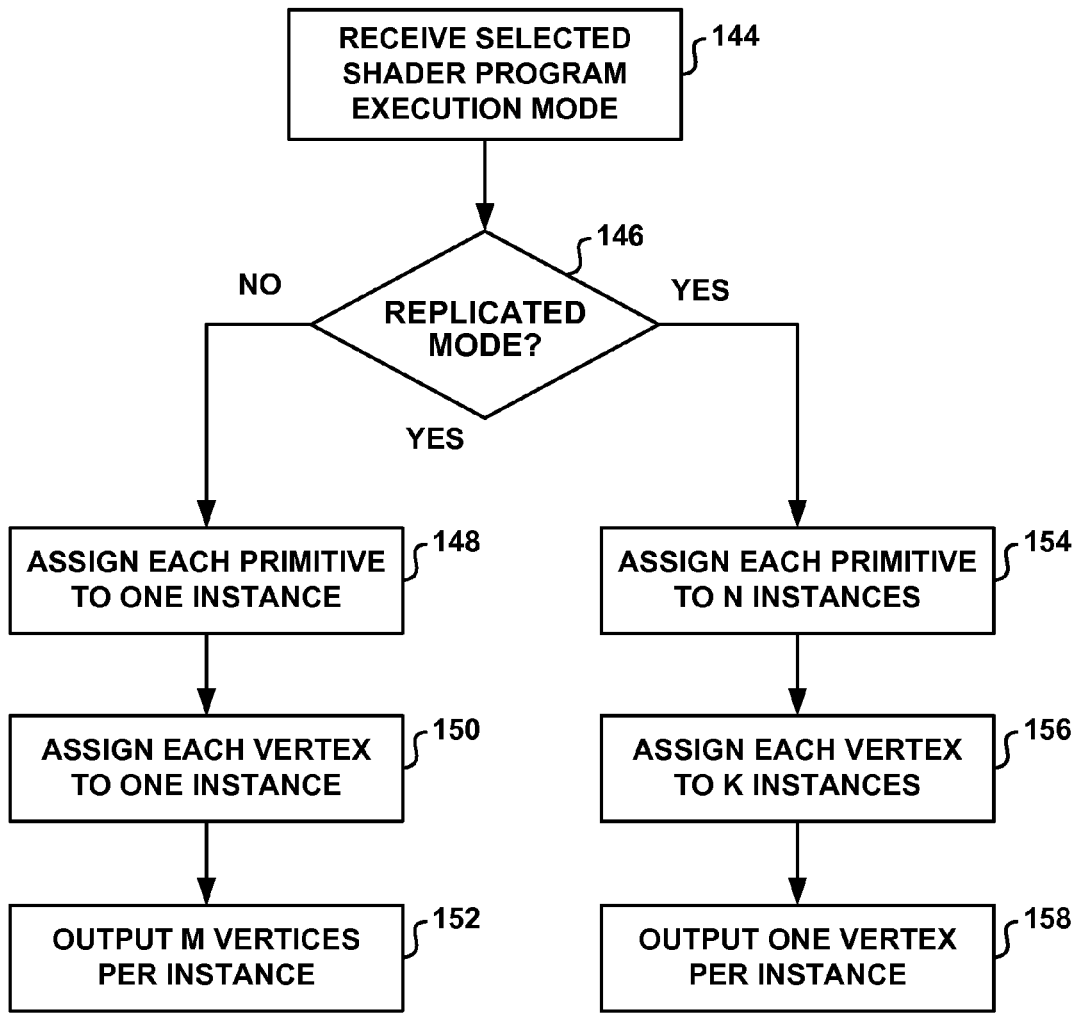
FIG. 10 is a flow diagram illustrating an example technique for executing a merged vertex/geometry shader program according to a replicated mode and a non-replicated mode in accordance with this disclosure.

FIG. 10 is a flow diagram illustrating an example technique for executing a merged vertex/geometry shader program according to a replicated mode and a non-replicated mode in accordance with this disclosure. In general, GPU 30 (e.g., one or more of shader units 38) may be configurable to operate in a non-replicated shader program execution mode and configurable to operate in a replicated shader program execution mode.

GPU 30 receives information indicative of a selected shader program execution mode to be used for executing a merged vertex/geometry shader program (144). GPU 30 determines whether the information indicative of the selected shader program execution mode indicates that the replicated mode is to be used for executing a merged vertex/geometry shader program (146).

If the information indicative of the selected shader program execution mode indicates that the replicated mode is not to be used for executing a merged vertex/geometry shader program, then GPU 30 may operate in the non-replicated mode. When operating in the non-replicated mode, shader unit 40 may operate based on a thread configuration where each of a plurality of primitives is assigned to one merged vertex/geometry shader instance for geometry shader processing (148), each of a plurality of vertices is assigned to one merged vertex/geometry shader instance for processing (150), and each of the instances of the merged vertex/geometry shader program outputs M output vertices (152). In some examples, thread scheduler 36 may assign each of a plurality of primitives to one merged vertex/geometry shader instance for geometry shader processing (148), and assign each of a plurality of vertices to one merged vertex/geometry shader instance for processing (150).

In some examples, M may be an integer greater than or equal to two. In further examples, M may be equal to how many vertices are generated for each of the primitives that are processed by a geometry shader stage that is implemented by the merged vertex/geometry shader program.

If the information indicative of the selected shader program execution mode indicates that the replicated mode is to be used for executing a merged vertex/geometry shader program, then GPU 30 may operate in the replicated mode. When operating in the replicated mode, shader unit 40 may operate based on a thread configuration where each of a plurality of primitives is assigned to N merged vertex/geometry shader instances for geometry shader processing (154), each of a plurality of vertices is assigned to K merged vertex/geometry shader instances for processing (156), and each of the instances of the merged vertex/geometry shader program outputs one output vertex (158). In some examples, thread scheduler 36 may assign each of a plurality of primitives to N merged vertex/geometry shader instances for geometry shader processing (154), and assign each of a plurality of vertices to K merged vertex/geometry shader instances for processing (156).

In some examples, N may be an integer greater than or equal to two. In further examples, N may be equal to a maximum output vertex count value that is specified by a geometry shader program that is implemented by the merged vertex/geometry shader program. The maximum output vertex count value being indicative of a maximum number of output vertices that are to be generated by the geometry shader program for each primitive that is processed by the geometry shader program. In additional examples, M may be less than or equal to N. In some examples, K may be an integer equal to how many primitives include the respective vertex.

Figure 11:
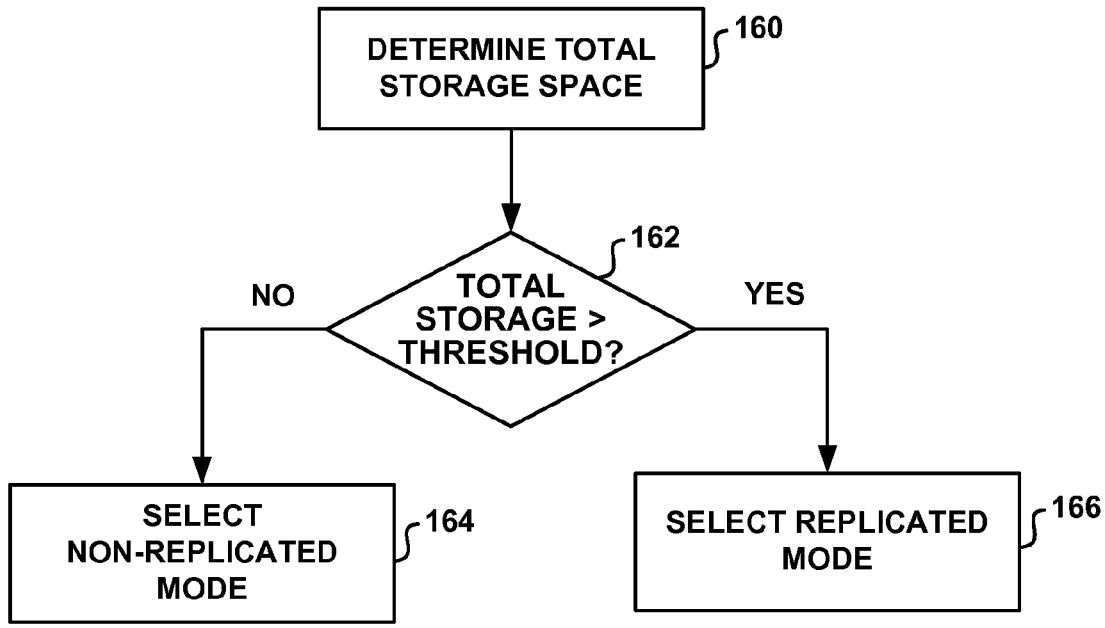
FIG. 11 is a flow diagram an example technique for selecting one of a replicated mode and a non-replicated for executing merged vertex/geometry shader programs according to this disclosure.

FIG. 11 is a flow diagram an example technique for selecting one of a replicated mode and a non-replicated for executing merged vertex/geometry shader programs according to this disclosure. CPU 104 and/or GPU driver 116 determines information indicative of a total amount of storage space required to store output vertices associated with a geometry shader program implemented by the merged vertex/geometry shader program (160). CPU 104 and/or GPU driver 116 determines whether the information indicative of the total amount of storage space is greater than a threshold (162).

CPU 104 and/or GPU driver 116 selects the non-replicated shader program execution mode as the selected shader program execution mode in response to determining that the information indicative of the total amount of storage space is not greater than the threshold (164). CPU 104 and/or GPU driver 116 selects the replicated shader program execution mode as the selected shader program execution mode in response to determining that the information indicative of the total amount of storage space is greater than the threshold (166).

In general, CPU 104 and/or GPU driver 116 may select one of a non-replicated shader program execution mode and a replicated shader program execution mode as a selected shader program execution mode to use for executing the merged vertex/geometry shader program based on information indicative of a total amount of storage space required to store output vertices associated with a geometry shader program implemented by the merged vertex/geometry shader program. CPU 104 and/or GPU driver 116 may cause shader unit 40 of GPU 30 to execute the merged vertex/geometry shader program based on the selected shader program execution mode.

In some examples, the non-replicated mode may use geometry shader functionality which is optimized for small amplification but can support all amplifications. The geometry shader functionality may be used with several different types of primitives including, e.g., a point sprite (one point in, 4 vertices out), a cube map (triangle in, 6 triangle out i.e. 18 vertices out), a shadow volume (triangle in, 15 vertices out).

In some examples, the non-replicated mode may support one fiber per geometry shader instance. In further examples, the non-replicated mode may, in some examples, avoid repeated ALU computations, avoid repeated resource allocations per vertex emit (e.g., GPRs), and/or avoid needing to implement specialized handling of unordered access view (UAV). In additional examples, the non-replicated mode may support vertex reuse for input primitives having less than 4 vertices.

In some examples, the non-replicated mode may provide better performance than the replicated mode in terms of the number of primitives that can be processed per wave as illustrated in the following examples. According to a first example, a plurality of point sprite primitives may be processed. The input topology may be a point list (i.e., PointList), and the maximum output vertex count for the geometry shader may be equal to four (i.e., MaxGSOutputVertex=4). In this example, the replicated mode may process 8 primitives per wave. However, the non-replicated mode may process 32 primitives per wave, thereby providing a 4 times improvement in primitive throughput per wave.

According to a second example, the input topology is a triangle strip (i.e., TriangleStrip), and MaxGSOutputVertex=4. In this example, the replicated mode may process 8 primitives per wave. However, the non-replicated mode may process 30 primitives per wave, thereby providing a 3.75 times improvement in primitive throughput per wave.

According to a third example, the input topology is a triangle list (i.e., TriangleStrip), and MaxGSOutputVertex=18 (e.g., a cube map). In this example, the replicated mode may process 2 primitives per wave. For example, the replicated mode may perform 32 emits per wave, and hence start processing them as soon as the wave is done. However, the non-replicated mode may process 30 primitives per wave, thereby providing a 3.75 times improvement in primitive throughput. For examples, the non-replicated mode may perform 18 emits per fiber (i.e. 576 vertices per wave), and hence process them when wave is completed. In some cases, a limited number of geometry shader wave may be able to be launched. However, a user may be able to program to limit the number of input geometry shader primitives per wave.

According to a fourth example, the input topology is a 10 control point patch (i.e., Patch_10), and MaxGSOutputVertex=4. In this example, the replicated mode may process 3 primitives per wave, and the non-replicated mode may process 3 primitives per wave (e.g., no vertex reuse). As such, there may be no performance improvement in terms of primitive throughput per wave. However, the non-replicated may nevertheless provide power savings because other lots of fibers in wave may not run the geometry shader (i.e., 3 fibers may be running geometry shader code).

In some examples, each merged vertex shader/geometry shader (VS|GS) fiber may support one primitive in, multi-vertex out. In some examples, a GPU may output multiple waves of vertices with a mask flag indicating which fiber has valid vertices (e.g., one wave per emit). In some examples, a vertex reuse check for input primitives may be performed to generate vertex shaders for unique vertices for input primitives in a given VS|GS wave for primitives with less than 4 vertices.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors.

In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
   determining, with a graphics processor, to operate in a first shader program execution mode;
   in response to the determination to operate in the first shader program execution mode, executing, with a shader unit of the graphics processor, a first plurality of instances of a merged vertex/geometry shader program that performs vertex shader processing and geometry shader processing, so that a single instance of the merged vertex/geometry shader program generates a first plurality of output vertices for each of a first plurality of primitives received by the merged vertex/geometry shader program;
   determining, with the graphics processor, to operate in a second shader program execution mode; and
   in response to the determination to operate in the second shader program execution mode, executing, with the shader unit of the graphics processor, a second plurality of instances of the merged vertex/geometry shader program to generate a second plurality of output vertices for each of a second plurality of primitives, so that each instance of the second plurality of instances of the merged vertex/geometry shader program outputs one output vertex.

2. The method of claim 1, wherein executing, with the shader unit of the graphics processor, the first plurality of instances of the merged vertex/geometry shader program further comprises:
   executing, with the shader unit, the first plurality of instances of the merged vertex/geometry shader program such that each of the first plurality of instances of the merged vertex/geometry shader program receives a respective one of a plurality of input vertices and generates multiple output vertices in response to receiving the respective one of the plurality of input vertices.

3. The method of claim 1, wherein executing, with the shader unit of the graphics processor, the first plurality of instances the merged vertex/geometry shader program further comprises:
   executing, with the shader unit, the first plurality of instances of the merged vertex/geometry shader program such that each of the first plurality of instances of the merged vertex/geometry shader program generates M output vertices, where M is an integer greater than or equal to two.

4. The method of claim 3, wherein M is equal to a maximum output vertex count value that is specified by a geometry shader program that is implemented by the merged vertex/geometry shader program, the maximum output vertex count value being indicative of a maximum number of output vertices that are to be generated by the geometry shader program for each primitive that is processed by the geometry shader program.

5. The method of claim 3,
   wherein each of the first plurality of instances of the merged vertex/geometry shader program is configurable to perform the geometry shader processing with respect to a primitive that is assigned to the respective instance of the merged vertex/geometry shader program, and
   wherein each of a plurality of primitives is assigned to one merged vertex/geometry shader instance for processing.

6. The method of claim 5,
   wherein each of the first plurality of instances of the merged vertex/geometry shader program is further configurable to perform the vertex shader processing with respect to a vertex that is assigned to the respective instance of the merged vertex/geometry shader program,
   wherein each of a plurality of vertices is assigned to one merged vertex/geometry shader instance for processing, and
   wherein at least one of the first plurality of instances of the merged vertex/geometry shader program is configured to perform the vertex shader processing with respect to one of the plurality of vertices and the geometry shader processing with respect to one of the plurality of primitives.

7. The method of claim 5, wherein each of the first plurality of instances of the merged vertex/geometry shader program is further configurable to perform the vertex shader processing with respect to a vertex that is assigned to the respective instance of the merged vertex/geometry shader program, and wherein executing, with the shader unit, the first plurality of instances of the merged vertex/geometry shader program further comprises:
   performing, with a first instance of the merged vertex/geometry shader program, the vertex shader processing with respect to one of a plurality of vertices to generate a vertex-shaded vertex;
   performing, with a second instance of the merged vertex/geometry shader program, the geometry shader processing with respect to a first primitive of the plurality of primitives based on the vertex-shaded vertex generated by the first instance of the merged vertex/geometry shader program to generate one or more geometry-shaded vertices that correspond to the first primitive; and
   performing, with a third instance of the merged vertex/geometry shader program, the geometry shader processing with respect to a second primitive of the plurality of primitives based on the vertex-shaded vertex generated by the first instance of the merged vertex/geometry shader program to generate one or more geometry-shaded vertices that correspond to the second primitive.

8. The method of claim 1, wherein the first plurality of output vertices comprise M output vertices;
wherein the second plurality of instances of the merged vertex/geometry shader program comprises N instances of the merged vertex/geometry shader program;
wherein the second plurality of output vertices comprise N output vertices;
wherein M is an integer greater than or equal to two; and
wherein N is an integer greater than or equal to two, and M is less than or equal to N.

9. The method of claim 8,
wherein M is equal to how many vertices are generated for each of the primitives that are processed by a geometry shader stage that is implemented by the merged vertex/geometry shader program, and
wherein N is equal to a maximum output vertex count value that is specified by a geometry shader program that is implemented by the merged vertex/geometry shader program, the maximum output vertex count value being indicative of a maximum number of output vertices that are to be generated by the geometry shader program for each of the primitives that is processed by the geometry shader program.

10. The method of claim 8,
wherein, when operating in the first shader program execution mode, each of a plurality of vertices is assigned to one merged vertex/geometry shader instance for processing, and
wherein, when operating in the second shader program execution mode, each of the plurality of vertices is assigned to K merged vertex/geometry shader instances for processing, where K is an integer equal to how many primitives include the respective vertex.

11. The method of claim 8, wherein the method further comprises:
selecting one of the first shader program execution mode and the second shader program execution mode as a selected shader program execution mode to use for executing the merged vertex/geometry shader program based on information indicative of a total amount of storage space required to store output vertices associated with a geometry shader program implemented by the merged vertex/geometry shader program; and
causing the shader unit to execute the merged vertex/geometry shader program based on the selected shader program execution mode.

12. The method of claim 11, wherein selecting the one of the first shader program execution mode and the second shader program execution mode comprises:
determining whether the information indicative of the total amount of storage space is greater than a threshold;
selecting the second shader program execution mode as the selected shader program execution mode in response to determining that the information indicative of the total amount of storage space is greater than the threshold; and
selecting the first shader program execution mode as the selected shader program execution mode in response to determining that the information indicative of the total amount of storage space is not greater than the threshold.

13. A device comprising:
a memory; and
a graphics processing unit (GPU) comprising a shader unit configured to:

determine to operate in a first shade program execution mode;
in response to the determination to operate in the first shader program execution mode, execute a first plurality of instances of a merged vertex/geometry shader program that performs vertex shader processing and geometry shader processing, so that a single instance of the merged vertex/geometry shader program generates a first plurality of output vertices for each of a first plurality of primitives received by the merged vertex/geometry shader program;
determine to operate in a second shader program execution mode; and
in response to the determination to operate in the second shader program execution mode, execute a second plurality of instances of the merged vertex/geometry shader program to generate a second plurality of output vertices for each of a second plurality of primitives, so that each instance of the second plurality of instances of the merged vertex/geometry shader program outputs one output vertex.

14. The device of claim 13, wherein the merged vertex/geometry shader unit is further configured to:
execute the first plurality of instances of the merged vertex/geometry shader program such that each of the first plurality of instances of the merged vertex/geometry shader program receives a respective one of a plurality of input vertices and generates the multiple output vertices in response to receiving the respective one of the plurality of input vertices.

15. The device of claim 13, wherein the merged vertex/geometry shader program is configurable to perform the vertex shader processing and the geometry shader processing, and wherein the shader unit is further configured to:
execute the first plurality of instances of the merged vertex/geometry shader program such that each of the first plurality of instances of the merged vertex/geometry shader program generates M output vertices, where M is an integer greater than or equal to two.

16. The device of claim 15, wherein M is equal to a maximum output vertex count value that is specified by a geometry shader program that is implemented by the merged vertex/geometry shader program, the maximum output vertex count value being indicative of a maximum number of output vertices that are to be generated by the geometry shader program for each primitive that is processed by the geometry shader program.

17. The device of claim 15,
wherein each of the first plurality of instances of the merged vertex/geometry shader program is configurable to perform the geometry shader processing with respect to a primitive that is assigned to the respective instance of the merged vertex/geometry shader program, and
wherein each of a plurality of primitives is assigned to one merged vertex/geometry shader instance for processing.

18. The device of claim 17,
wherein each of the instances of the first plurality of instances of the merged vertex/geometry shader program is further configurable to perform the vertex shader processing with respect to a vertex that is assigned to the respective instance of the first plurality of instances of the merged vertex/geometry shader program, wherein each of a plurality of vertices is assigned to one merged vertex/geometry shader instance for processing, and wherein at least one of the first plurality of instances of the merged vertex/geometry shader program is configured to perform the vertex shader processing with respect to one of the plurality of vertices and the geometry shader processing with respect to one of the plurality of primitives.

19. The device of claim 17, wherein each of the instances of the first plurality of instances of the merged vertex/geometry shader program is further configurable to perform the vertex shader processing with respect to a vertex that is assigned to the respective instance of the first plurality of instances of the merged vertex/geometry shader program, and wherein the shader unit is further configured to:

perform, with a first instance of the merged vertex/geometry shader program, the vertex shader processing with respect to one of a plurality of vertices to generate a vertex-shaded vertex;

perform, with a second instance of the merged vertex/geometry shader program, the geometry shader processing with respect to a first primitive of the plurality of primitives based on the vertex-shaded vertex generated by the first instance of the merged vertex/geometry shader program to generate one or more geometry-shaded vertices that correspond to the first primitive; and perform, with a third instance of the merged vertex/geometry shader program, the geometry shader processing with respect to a second primitive of the plurality of primitives based on the vertex-shaded vertex generated by the first instance of the merged vertex/geometry shader program to generate one or more geometry-shaded vertices that correspond to the second primitive.

20. The device of claim 13,
wherein the first plurality of output vertices comprise M output vertices;
wherein the second plurality of instances of the merged vertex/geometry shader program comprises N instances of the merged vertex/geometry shader program;
wherein the second plurality of output vertices comprise N output vertices;
wherein M is an integer greater than or equal to two; and
wherein N is an integer greater than or equal to two, and M is less than or equal to N.

21. The device of claim 20,
wherein M is equal to how many vertices are generated for each of the primitives that are processed by a geometry shader stage that is implemented by the merged vertex/geometry shader program, and
wherein N is equal to a maximum output vertex count value that is specified by a geometry shader program that is implemented by the merged vertex/geometry shader program, the maximum output vertex count value being indicative of a maximum number of output vertices that are to be generated by the geometry shader program for each of the primitives that is processed by the geometry shader program.

22. The device of claim 20,
wherein, when operating in the first shader program execution mode, each of a plurality of vertices is assigned to one merged vertex/geometry shader instance for processing, and
wherein, when operating in the second shader program execution mode, each of the plurality of vertices is assigned to K merged vertex/geometry shader instances for processing, where K is an integer equal to how many primitives include the respective vertex.

23. The device of claim 20, wherein the device further comprises:
one or more processors configured to:
select one of a first shader program execution mode and the second shader program execution mode as a selected shader program execution mode to use for executing the merged vertex/geometry shader program based on information indicative of a total amount of storage space required to store output vertices associated with a geometry shader program implemented by the merged vertex/geometry shader program; and
cause the shader unit to execute the merged vertex/geometry shader program based on the selected shader program execution mode.

24. The device of claim 23, wherein the one or more processors are further configured to:
determine whether the information indicative of the total amount of storage space is greater than a threshold;
select the second shader program execution mode as the selected shader program execution mode in response to determining that the information indicative of the total amount of storage space is greater than the threshold; and
select the first shader program execution mode as the selected shader program execution mode in response to determining that the information indicative of the total amount of storage space is not greater than the threshold.

25. The device of claim 13, wherein the device comprises a wireless communication device.

26. The device of claim 13, wherein the device comprises a mobile phone handset.

27. An apparatus comprising:
a graphics processor comprising a shader unit;
means for determining to operate in a first shader program execution mode;
means for, in response to the determination to operate in the first shader program execution mode, executing a first plurality of a merged vertex/geometry shader program that performs vertex shader processing and geometry shader processing, so that a single instance of the merged vertex/geometry shader program generates a first plurality of output vertices for each of a first plurality of primitives that is received by the merged vertex/geometry shader program;
means for determining to operate in a second shader program execution mode; and
means for, in response to the determination to operate in the second shader program execution mode, executing a second plurality of instances of the merged vertex/geometry shader program to generate a second plurality of output vertices for each of a second plurality of primitives, so that each instance of the second plurality of instances of the merged vertex/geometry shader program outputs one output vertex.

28. A non-transitory computer readable storage medium storing instructions that upon execution by one or more processors cause the one or more processors to:
determine, with a graphics processor, to operate in a first shade program execution mode;
in response to the determination to operate in the first shader program execution mode, execute, with a shader unit of the graphics processor, a first plurality of instances of a merged vertex/geometry shader program that performs vertex shader processing and geometry shader processing, so that a single instance of the merged vertex/geometry shader program generates a first plurality of output vertices for each of a first plurality of primitives received by the merged vertex/geometry shader program;

determine, with the graphics processor, to operate in a second shader program execution mode; and in response to the determination to operate in the second shader program execution mode, execute, with the shader unit of the graphics processor, a second plurality of instances of the merged vertex/geometry shader program to generate a second plurality of output vertices for each of a second plurality of primitives, so that each instance of the second plurality of instances of the merged vertex/geometry shader program outputs one output vertex.

* * * * *